United States Patent
Oiwa et al.

(10) Patent No.: US 9,624,838 B2
(45) Date of Patent: Apr. 18, 2017

(54) AIR INTAKE CONTROL VALVE AND AIR INTAKE APPARATUS

(71) Applicant: AISIN SEIKI KABUSHIKI KAISHA, Kariya-shi, Aichi-ken (JP)

(72) Inventors: Toshiyuki Oiwa, Kariya (JP); Masato Ishii, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/442,763

(22) PCT Filed: Sep. 24, 2013

(86) PCT No.: PCT/JP2013/075648
§ 371 (c)(1),
(2) Date: May 14, 2015

(87) PCT Pub. No.: WO2014/080689
PCT Pub. Date: May 30, 2014

(65) Prior Publication Data
US 2015/0330515 A1    Nov. 19, 2015

(30) Foreign Application Priority Data
Nov. 20, 2012 (JP) .................. 2012-253963

(51) Int. Cl.
*F02D 9/10* (2006.01)
*F16K 1/226* (2006.01)
(Continued)

(52) U.S. Cl.
CPC ........ *F02D 9/1015* (2013.01); *F02B 27/0215* (2013.01); *F02B 27/0263* (2013.01);
(Continued)

(58) Field of Classification Search
CPC .... F16K 1/2261; F16K 1/2285; F16K 1/2268; F02D 9/1015; F02D 9/1095; F02B 27/0215; F02B 27/0273
(Continued)

(56) References Cited

U.S. PATENT DOCUMENTS 2,816,729 A * 12/1957 Jensen .................. F16K 1/2285
137/315.04
3,260,502 A * 7/1966 Plumer ................. F16K 1/2261
251/306
(Continued)

FOREIGN PATENT DOCUMENTS

JP    55-137761 U    10/1980
JP    62-115567 U    7/1987
(Continued)

OTHER PUBLICATIONS

International Search Report (PCT/ISA/210) mailed on Dec. 17, 2013, by the Japanese Patent Office as the International Searching Authority for International Application No. PCT/JP2013/075648.
(Continued)

*Primary Examiner* — Mary McManmon
*Assistant Examiner* — Richard K Durden
(74) *Attorney, Agent, or Firm* — Buchanan Ingersoll & Rooney PC

(57) ABSTRACT

The present air intake control valve includes a valve body and a seal portion being elastically deformable to seal between an inner wall surface of an air intake port and the valve body. The seal portion is formed in a bending configuration including a first hinge portion and a second hinge portion each serving as a supporting point upon elastic deformation of the seal portion. One of the first hinge portion and the second hinge portion is arranged at an upstream side of the air intake port and the other of the first
(Continued)

STATE OF VALVE BODY AT OPEN POSITION (FIRST EMBODIMENT)

hinge portion and the second hinge portion is arranged at a downstream side in a state where the valve body is at a closed position.

8 Claims, 9 Drawing Sheets

(51) Int. Cl.
  *F16K 1/228* (2006.01)
  *F02B 27/02* (2006.01)
(52) U.S. Cl.
  CPC .......... *F02B 27/0273* (2013.01); *F02D 9/107* (2013.01); *F02D 9/1095* (2013.01); *F16K 1/2261* (2013.01); *F16K 1/2285* (2013.01); *Y02T 10/146* (2013.01)
(58) Field of Classification Search
  USPC ....................................................... 251/306
  See application file for complete search history.

(56) References Cited

U.S. PATENT DOCUMENTS

| | | | | |
|---|---|---|---|---|
| 3,282,555 A | * | 11/1966 | Mallonee, II | F16K 1/2285 251/306 |
| 4,593,916 A | * | 6/1986 | Laulhe | F16K 1/226 251/306 |
| 6,412,755 B2 | * | 7/2002 | Ito | B60H 1/00671 251/173 |
| 6,722,335 B2 | * | 4/2004 | Nomura | F02B 27/02 123/184.36 |
| 2002/0152982 A1 | * | 10/2002 | Pietrowski | F02D 9/1095 123/184.56 |
| 2013/0087734 A1 | | 4/2013 | Duboy | |

FOREIGN PATENT DOCUMENTS

| | | |
|---|---|---|
| JP | 7-55019 A | 3/1995 |
| JP | 2000-35137 A | 2/2000 |
| JP | 2010-1847 A | 1/2010 |
| WO | WO 2011/151533 A1 | 12/2011 |

OTHER PUBLICATIONS

Written Opinion (PCT/ISA/237) mailed on Dec. 17, 2013, by the Japanese Patent Office as the International Searching Authority for International Application No. PCT/JP2013/075648.

\* cited by examiner

FIG.5
STATE OF VALVE BODY AT OPEN POSITION (FIRST EMBODIMENT)
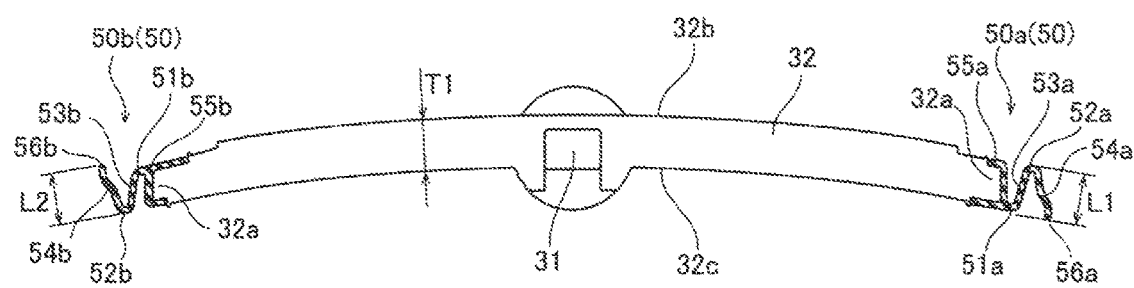
FIG.6  STATE OF VALVE BODY AT CLOSED POSITION (FIRST EMBODIMENT)
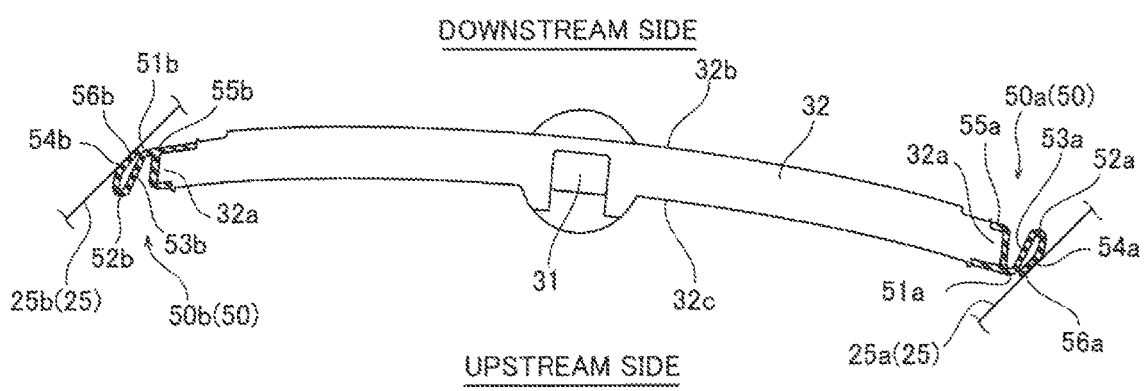

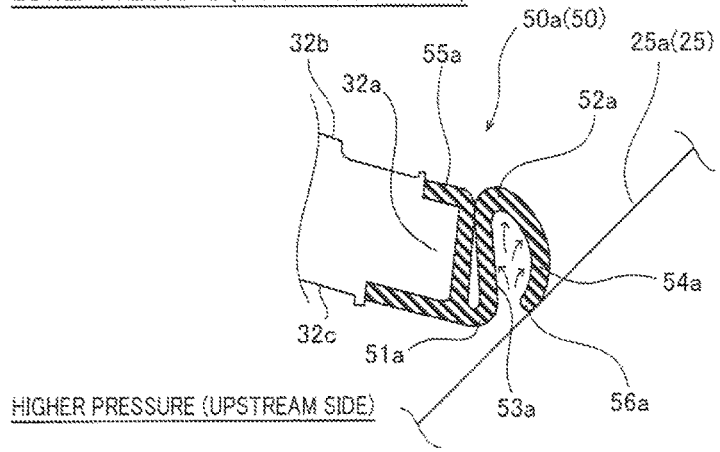
FIG.7 STATE WHERE PRESSURE AT DOWNSTREAM SIDE IS LOWER THAN PRESSURE AT UPSTREAM SIDE (FIRST SEAL PORTION)
(FIRST EMBODIMENT)
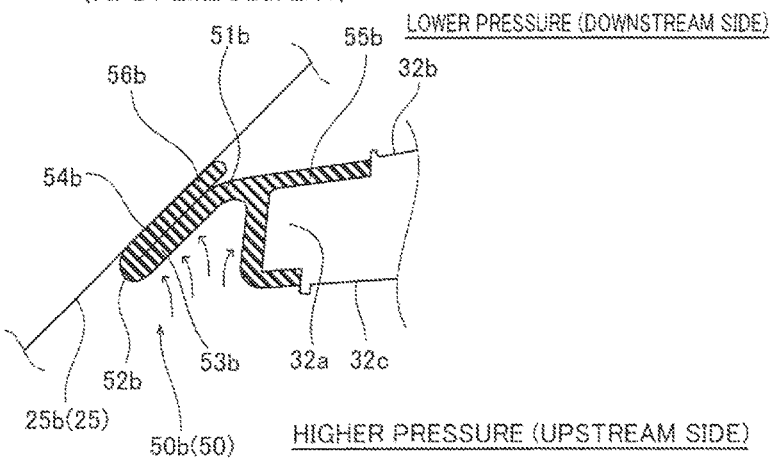
FIG.8 STATE WHERE PRESSURE AT DOWNSTREAM SIDE IS LOWER THAN PRESSURE AT UPSTREAM SIDE (SECOND SEAL PORTION)
(FIRST EMBODIMENT)

FIG. 9 STATE WHERE PRESSURE AT UPSTREAM SIDE IS LOWER THAN PRESSURE AT DOWNSTREAM SIDE (FIRST SEAL PORTION)
(FIRST EMBODIMENT)
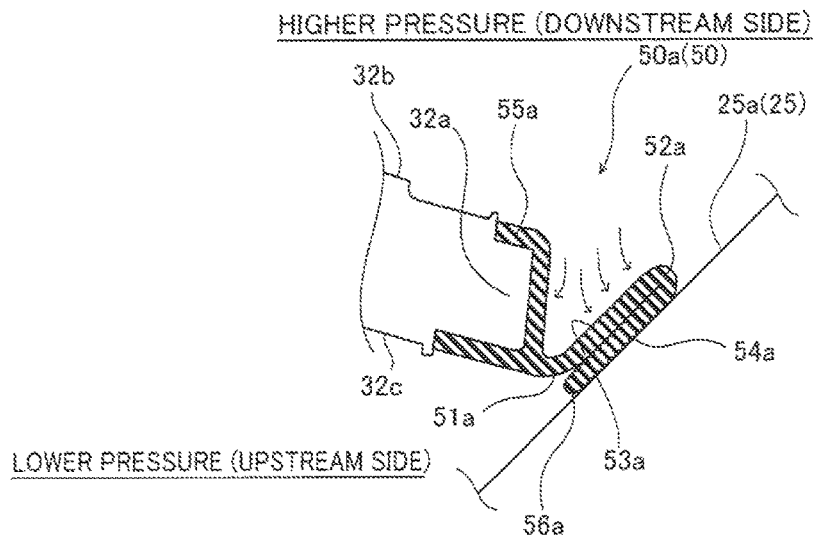
FIG. 10 STATE WHERE PRESSURE AT UPSTREAM SIDE IS LOWER THAN PRESSURE AT DOWNSTREAM SIDE (SECOND SEAL PORTION)
(FIRST EMBODIMENT)
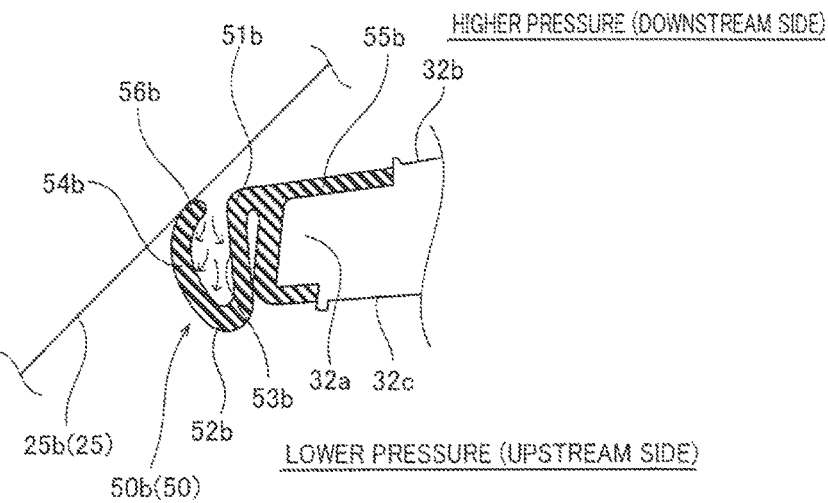

STATE OF VALVE BODY AT OPEN POSITION (SECOND EMBODIMENT)

STATE OF VALVE BODY AT CLOSED POSITION (SECOND EMBODIMENT)

FIG. 13 STATE WHERE PRESSURE AT DOWNSTREAM SIDE IS LOWER THAN PRESSURE AT UPSTREAM SIDE (FIRST SEAL PORTION)
(SECOND EMBODIMENT)
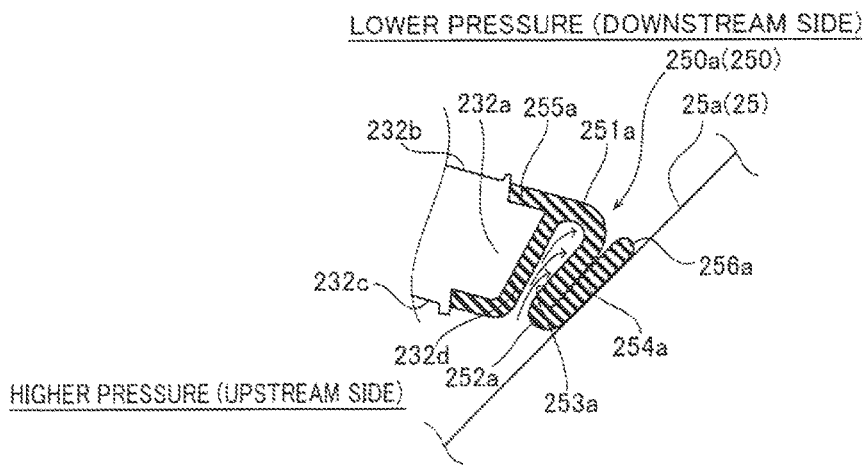
FIG. 14
STATE WHERE PRESSURE AT DOWNSTREAM SIDE IS LOWER THAN PRESSURE AT UPSTREAM SIDE (SECOND SEAL PORTION)
(SECOND EMBODIMENT)
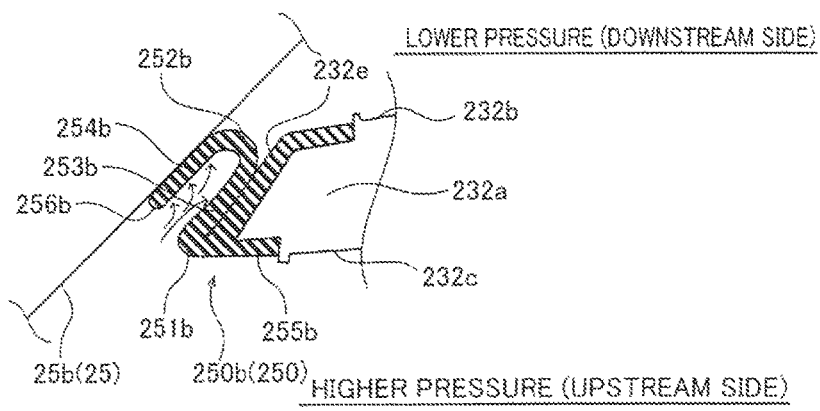

FIG.15 STATE WHERE PRESSURE AT UPSTREAM SIDE IS LOWER THAN PRESSURE AT DOWNSTREAM SIDE (FIRST SEAL PORTION)
(SECOND EMBODIMENT)
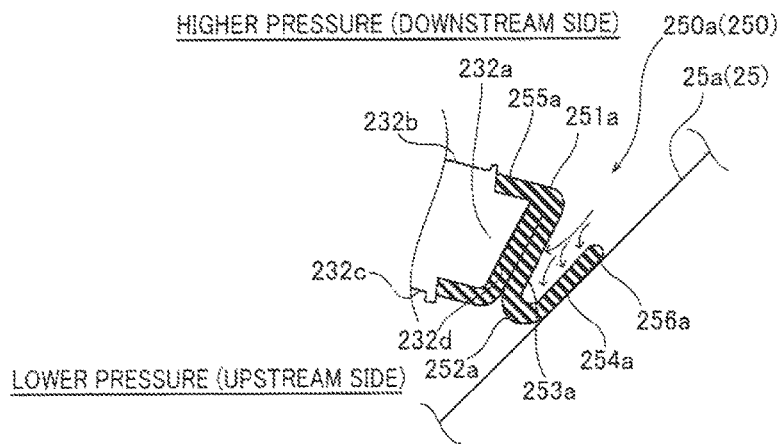
FIG.16 STATE WHERE PRESSURE AT UPSTREAM SIDE IS LOWER THAN PRESSURE AT DOWNSTREAM SIDE (SECOND SEAL PORTION)
(SECOND EMBODIMENT)
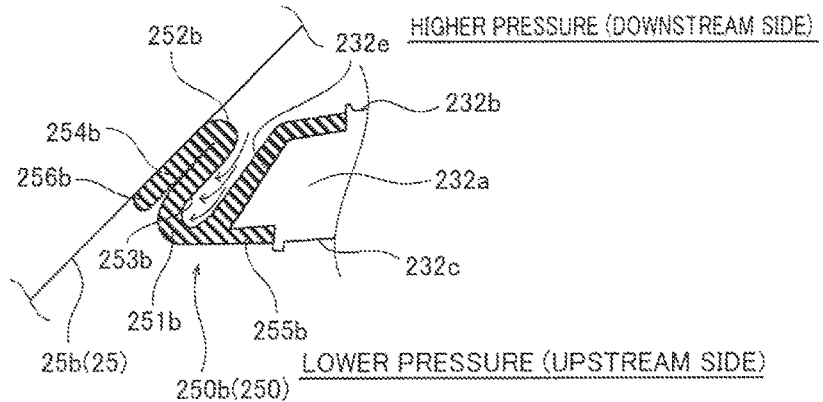

AIR INTAKE CONTROL VALVE AND AIR INTAKE APPARATUS

TECHNICAL FIELD

This invention relates to an air intake control valve and an air intake apparatus.

BACKGROUND ART

Conventionally, an air intake control valve including a seal portion that is arranged at an outer peripheral portion of a valve body is known. Such an air intake control valve is disclosed, for example, in JP2010-1847A.

JP2010-1847A discloses an air intake control valve including a valve body in a plate form provided at a boundary of an air intake port relative to a collector (surge tank), and an elastically deformable seal lip (seal portion) disposed at an outer peripheral portion of the valve body for sealing between an inner wall surface of the air intake port and the valve body. The seal lip is formed to extend from the vicinity of an outer peripheral end surface of the valve body in the plate form via a single hinge portion (i.e., a supporting point at the time of elastic deformation) in an opposite direction from a rotation direction of the valve body in a case where the valve body is brought to a closed state. That is, an extending direction of the seal lip that is elastically deformed with reference to the single hinge portion serving as the supporting point at one side in a direction orthogonal to a rotation shaft of the valve body and an extending direction of the seal lip at the other side are opposite from each other. The seal lip is configured to make contact with the inner wall surface of the air intake port by being elastically deformed inwardly with reference to the single hinge portion serving as the supporting point in a case where the valve body is brought to the closed state. In addition, according to the air intake control valve, in the closed state of the valve body, a flow speed of intake air at the intake port side (downstream side) is faster than a flow speed at the collector (surge tank) side (upstream side). Thus, it is considered that a pressure at the downstream side (air intake port side) is lower than a pressure at the upstream side (collector (surge tank) side). In this case, resulting from a pressure difference, the seal lip positioned at each of one side and the other side of the direction orthogonal to the rotation shaft of the valve body is applied with a force towards the air intake port side from the surge tank side of the valve body.

DOCUMENT OF PRIOR ART

Patent Document

Patent document 1: JP2010-1847A

OVERVIEW OF INVENTION

Problem to be Solved by Invention

Nevertheless, according to the air intake control valve in JP2010-1847A, the extending direction of the seal lip that is elastically deformed with reference to the single hinge portion serving as the supporting point at one side in the direction orthogonal to the rotation shaft of the valve body and the extending direction of the seal lip at the other side are opposite from each other. Thus, in a case where a force resulting from the aforementioned pressure difference is applied, the seal lip at one side in the direction orthogonal to the rotation shaft of the valve body is elastically deformed in a direction expanding outwardly with reference to the single hinge portion as the supporting point so as to make close contact with the inner wall surface of the air intake port. On the other hand, the seal lip at the other side in the direction orthogonal to the rotation shaft of the valve body is elastically deformed inwardly so as to separate from the inner wall surface of the air intake port with reference to the single hinge portion as the supporting point by the force resulting from the pressure difference, which is considered to decrease sealing ability. Accordingly, in the air intake control valve in JP2010-1847A, there is an issue that it is difficult to maintain the sealing ability in a case where the pressure difference exists between the upstream side (collector (surge tank) side) and the downstream side (air intake port side).

The present invention, which is made to solve such the issue mentioned above, includes an object to provide an air intake control valve and an air intake apparatus which can maintain excellent sealing ability even in a case where a pressure difference exists between an upstream side and a downstream side.

Means for Solving Problem

In order to achieve the aforementioned object, an air intake control valve according to a first aspect of the present invention includes a valve body provided at an air intake port to rotate around a rotation shaft between an open position and a closed position, and a seal portion arranged at one side and the other side of an outer peripheral portion of the valve body in a direction orthogonal to the rotation shaft of the valve body and sealing between an inner wall surface of the air intake port and the valve body by making contact with the inner wall surface of the air intake port in a state where the valve body is at the closed position, the seal portion being elastically deformable, the seal portion being formed in a bending configuration including a first hinge portion and a second hinge portion each serving as a supporting point upon elastic deformation of the seal portion, one of the first hinge portion and the second hinge portion being arranged at an upstream side of the air intake port and the other of the first hinge portion and the second hinge portion being arranged at a downstream side of the air intake port in the state where the valve body is at the closed position.

In the air intake control valve according to the first aspect of the invention, as mentioned above, the seal portion is formed in the bending configuration including the first hinge portion and the second hinge portion each serving as the supporting point upon the elastic deformation of the seal portion, and one of the first hinge portion and the second hinge portion is arranged at the upstream side of the air intake port and the other of the first hinge portion and the second hinge portion is arranged at the downstream side of the air intake port in the state where the valve body is at the closed position. Thus, the seal portion is bent in different directions from each other at the first hinge portion and the second hinge portion. The seal portion is elastically deformable in a direction further expanding outwardly with reference to one of the first hinge portion and the second hinge portion as the supporting point at one side and the other side orthogonal to the rotation shaft of the valve body in a case where a pressure difference exists between the upstream side and the downstream side and the force resulting from the pressure difference is applied to the seal portion. As a result, even in a case where the pressure difference exists between the upstream side and the downstream side, a tip end portion (contact portion) of the seal portion may be brought to make further close contact with the inner wall surface of the air intake port so that excellent sealing ability may be maintained. In addition, even in a case where a magnitude correlation between a pressure at the upstream side and a pressure at the downstream side is reversed due to an air intake pulsation, the seal portion is elastically deformable in the direction expanding outwardly with reference to the other of the first hinge portion and the second hinge portion as the supporting point to thereby maintain the excellent sealing ability. That is, in the present invention, because of the first hinge portion and the second hinge portion, the outward elastic deformation with reference to the first hinge portion and the outward elastic deformation with reference to the second hinge portion are simply exchanged with each other when the magnitude correlation between the pressure at the upstream side and the pressure at the downstream side is reversed (i.e., a direction of a force applied to the seal portion by the pressure difference is reversed). The excellent sealing ability may be maintained by either one of the aforementioned two elastic deformations.

In addition, because the seal portion is formed in the bending configuration including the first hinge portion and the second hinge portion, the seal portion is easily elastically deformable with reference to the first hinge portion and the second hinge portion as the supporting points. Not only in a case where the pressure difference between the upstream side and the downstream side is large but also in a case where the pressure difference between the upstream side and the downstream side is small, the seal portion is easily elastically deformable in a direction where the tip end portion (contact portion) of the seal portion is pressed against the inner wall surface of the air intake port by the force applied to the seal portion resulting from the aforementioned pressure difference. As a result, regardless of the magnitude of the pressure difference between the upstream side and the downstream side, the excellent sealing is obtainable.

In the air intake control valve according to the aforementioned first aspect, preferably, the seal portion includes a connection portion connecting the first hinge portion and the second hinge portion and a contact portion protruding outwardly from the second hinge portion, and the contact portion is configured to make contact with the inner wall surface of the air intake port in a further closely contacting state by an application of a force in a direction in which the connection portion or the contact portion is elastically deformed with reference to the first hinge portion or the second hinge portion serving as the supporting point by a pressure difference between an upstream side and a downstream side in the state where the valve body is at the closed position. Accordingly, in a case where the pressure difference exists between the upstream side and the downstream side, the force applied to the seal portion resulting from the pressure difference is effectively utilized to improve the sealing ability between the inner wall surface of the air intake port and the valve body, which may easily maintain the excellent sealing ability.

In this case, preferably, the seal portion is formed in a bending configuration in a letter-V shape by the connection portion and the contact portion, and the first hinge portion and the second hinge portion are provided at one end and a halfway return point of the bending configuration in the letter-V shape respectively. Accordingly, the seal portion in the letter-V shape formed by the connection portion and the contact portion is utilized to further improve the sealing ability in a case where the pressure difference exists between the upstream side and the downstream side.

In the air intake control valve according to the aforementioned first aspect, preferably, the valve body is formed in a plate form, and the seal portion including the first hinge portion and the second hinge portion includes a length in a thickness direction of the valve body equal to or smaller than a thickness of the valve body in the plate form. Accordingly, the seal portion may be formed at the outer peripheral portion of the valve body in the plate form so as not to protrude in the thickness direction of the valve body. As compared to a case where the seal portion protrudes in the thickness direction of the valve body, an air intake resistance by the seal portion may be reduced. As a result, a pressure loss of intake air flowing through the air intake port may be restrained from increasing.

In the air intake control valve according to the aforementioned first aspect, preferably, the seal portion includes a first seal portion arranged at a portion at the one side of the outer peripheral portion of the valve body in the direction orthogonal to the rotation shaft of the valve body, the first hinge portion being arranged at an upstream side while the second hinge portion being arranged at a downstream side and a second seal portion arranged at a portion at the other side of the outer peripheral portion of the valve body in the direction orthogonal to the rotation shaft of the valve body, the first hinge portion being arranged at a downstream side while the second hinge portion being arranged at an upstream side. Accordingly, the first seal portion and the second seal portion where positions of the first hinge portion and the second hinge portion at the first seal portion and positions of the first hinge portion and the second hinge portion at the second seal portion are reversed from one another are provided at one side and the other side of the outer peripheral portion of the valve body in the direction orthogonal to the rotation shaft of the valve body. Thus, in a case where contacting directions of the seal portion relative to the inner wall surface of the air intake port at one side and the other side of the outer peripheral portion of the valve body in the direction orthogonal to the rotation shaft of the valve body are different from each other, the seal portion may be provided in a form conforming to both the contacting directions of the seal portion relative to the inner wall surface of the air intake port at one side and the other side of the outer peripheral portion of the valve body in the direction orthogonal to the rotation shaft of the valve body. Because of the above, the sealing ability in a case where the pressure difference exists between the upstream side and the downstream side is improvable.

In this case, preferably, each of the first seal portion and the second seal portion includes a connection portion connecting the first hinge portion and the second hinge portion and a contact portion protruding outwardly from the second hinge portion, the first seal portion is configured so that the contact portion makes contact with the inner wall surface of the air intake port in a further closely contacting state by an application of a force causing the contact portion to be elastically deformed outwardly with reference to the second hinge portion serving as the supporting point by a pressure difference in a case where a pressure at a downstream side is lower than a pressure at an upstream side in the state where the valve body is at the closed position, and the second seal portion is configured so that the contact portion makes contact with the inner wall surface of the air intake port in a further closely contacting state by an application of a force causing the connection portion to be elastically deformed in a direction where the connection portion expands outwardly with reference to the first hinge portion serving as the supporting point by a pressure difference in a case where a pressure at a downstream side is lower than a pressure at an upstream side in the state where the valve body is at the closed position. Accordingly, in a case where the pressure at the downstream side is lower than the pressure at the upstream side, the contact portion makes contact with the inner wall surface of the air intake port in a further closely contacting state by the application of the force causing the contact portion to be elastically deformed outwardly with reference to the second hinge portion serving as the supporting point in the first seal portion while the contact portion makes contact with the inner wall surface of the air intake port in a further closely contacting state by the application of the force causing the connection portion to be elastically deformed in the direction where the connection portion expands outwardly with reference to the first hinge portion serving as the supporting point in the second seal portion. Thus, in a construction where the first seal portion and the second seal portion in which positions of the first hinge portion and the second hinge portion at the first seal portion and positions of the first hinge portion and the second hinge portion at the second seal portion are reversed from one another are provided, the sealing ability in a case where the pressure at the downstream side is lower than the pressure at the upstream side may be excellently maintained.

In a construction where each of the first seal portion and the second seal portion includes the connection portion and the contact portion, preferably, the first seal portion is configured so that the contact portion makes contact with the inner wall surface of the air intake port in a further closely contacting state by an application of a force causing the connection portion to be elastically deformed in a direction where the connection portion expands outwardly with reference to the first hinge portion serving as the supporting point by a pressure difference in a case where a pressure at an upstream side becomes lower than a pressure at a downstream side by an air intake pulsation in the state where the valve body is at the closed position, and the second seal portion is configured so that the contact portion makes contact with the inner wall surface of the air intake port in a further closely contacting state by an application of a force causing the contact portion to be elastically deformed outwardly with reference to the second hinge portion serving as the supporting point by a pressure difference in a case where a pressure at an upstream side becomes lower than a pressure at a downstream side by an air intake pulsation in the state where the valve body is at the closed position. Accordingly, in the construction where the first seal portion and the second seal portion in which positions of the first hinge portion and the second hinge portion at the first seal portion and positions of the first hinge portion and the second hinge portion at the second seal portion are reversed from one another are provided, the sealing ability may be excellently maintained at both one side and the other side of the outer peripheral portion of the valve body in the direction orthogonal to the rotation shaft of the valve body not only in a case where the pressure at the downstream side is lower than the pressure at the upstream side but also in a case where the magnitude correlation between the pressure at the downstream side and the pressure and the upstream side is reversed resulting from the air intake pulsation.

An air intake apparatus according to a second aspect of the present invention includes a surge tank and an air intake port arranged at a downstream of the surge tank, and an air intake control valve provided at the air intake port, wherein the air intake control valve includes a valve body rotating around a rotation shaft between an open position and a closed position, a seal portion arranged at one side and the other side of an outer peripheral portion of the valve body in a direction orthogonal to the rotation shaft of the valve body and sealing between an inner wall surface of the air intake port and the valve body by making contact with the inner wall surface of the air intake port in a state where the valve body is at the closed position, the seal portion being elastically deformable, the seal portion being formed in a bending configuration including a first hinge portion and a second hinge portion each serving as a supporting point upon elastic deformation of the seal portion, one of the first hinge portion and the second hinge portion being arranged at an upstream side of the air intake port and the other of the first hinge portion and the second hinge portion being arranged at a downstream side of the air intake port in the state where the valve body is at the closed position.

In the air intake apparatus according to the second aspect of the invention, as mentioned above, the seal portion is formed in the bending configuration including the first hinge portion and the second hinge portion each serving as the supporting point upon the elastic deformation of the seal portion, and one of the first hinge portion and the second hinge portion is arranged at the upstream side of the air intake port and the other of the first hinge portion and the second hinge portion is arranged at the downstream side of the air intake port in the state where the valve body is at the closed position. Thus, the seal portion is bent in different directions from each other at the first hinge portion and the second hinge portion. The seal portion is elastically deformable in a direction further expanding outwardly with reference to one of the first hinge portion and the second hinge portion as the supporting point at one side and the other side orthogonal to the rotation shaft of the valve body in a case where a pressure difference exists between the upstream side and the downstream side and the force resulting from the pressure difference is applied to the seal portion. As a result, even in a case where the pressure difference exists between the upstream side and the downstream side, a tip end portion (contact portion) of the seal portion may be brought to make further close contact with the inner wall surface of the air intake port so that excellent sealing ability may be maintained. In addition, even in a case where a magnitude correlation between a pressure at the upstream side and a pressure at the downstream side is reversed due to an air intake pulsation, the seal portion is elastically deformable in the direction expanding outwardly with reference to the other of the first hinge portion and the second hinge portion as the supporting point to thereby maintain the excellent sealing ability. That is, in the present invention, because of the first hinge portion and the second hinge portion, the outward elastic deformation with reference to the first hinge portion and the outward elastic deformation with reference to the second hinge portion are simply exchanged with each other when the magnitude correlation between the pressure at the upstream side and the pressure at the downstream side is reversed (i.e., a direction of a force applied to the seal portion by the pressure difference is reversed). The excellent sealing ability may be maintained by either of the aforementioned two elastic deformations.

In addition, because the seal portion is formed in the bending configuration including the first hinge portion and the second hinge portion, the seal portion is easily elastically deformable with reference to the first hinge portion and the second hinge portion as the supporting points. Not only in a case where the pressure difference between the upstream side and the downstream side is large but also in a case where the pressure difference between the upstream side and the downstream side is small, the seal portion is easily elastically deformable in a direction where the tip end portion (contact portion) of the seal portion is pressed against the inner wall surface of the air intake port by the force applied to the seal portion resulting from the aforementioned pressure difference. As a result, regardless of the magnitude of the pressure difference between the upstream side and the downstream side, the excellent sealing is obtainable.

In the air intake apparatus according to the aforementioned second aspect, preferably, the inner wall surface of the air intake port includes a contact surface formed by a first inclination surface, the outer peripheral portion of the valve body includes a second inclination surface conforming to the first inclination surface of the contact surface of the air intake port, and the seal portion including the first hinge portion and the second hinge portion is mounted to the outer peripheral portion of the valve body including the second inclination surface. Accordingly, because of the contact surface formed by the first inclination surface of the air intake port, the intake air may smoothly circulate, which restrains a pressure loss of intake air circulating the air intake port from increasing. In addition, because the second inclination surface conforming to the contact surface formed by the first inclination surface of the air intake port is formed at the outer peripheral portion of the valve body, the seal portion mounted to the outer peripheral portion of the valve body may easily make contact with the inner wall surface of the air intake port.

In the present application, besides the aforementioned air intake control valve according to the first aspect and the air intake apparatus according to the second aspect, the other construction as below may be considered.

That is, the air intake control valve according to the other construction of the present application includes a valve body provided at an air intake port to rotate around a rotation shaft between an open position and a closed position, and a seal portion arranged at one side and the other side of an outer peripheral portion of the valve body in a direction orthogonal to the rotation shaft of the valve body and sealing between an inner wall surface of the air intake port and the valve body by making contact with the inner wall surface of the air intake port in a state where the valve body is at the closed position, the seal portion being elastically deformable, the seal portion being formed by a connection of a first portion and a second portion in a bending configuration, the first portion and the second portion being elastically deformable, one of the first portion and the second portion being formed to extend towards an upstream side of the air intake port while the other of the first portion and the second portion being formed to extend towards a downstream side in the state where the valve body is at the closed position. Accordingly, because the first portion and the second portion are formed to extend in different directions from each other, one of the first portion and the second portion is elastically deformable in a direction expanding outwardly at both one side and the other side orthogonal to the rotation shaft of the valve body in a case where the pressure difference exists between the upstream side and the downstream side and a force resulting from the pressure difference is applied to the seal portion in the state where the valve body is at the closed position. As a result, even in a case where the pressure difference exists between the upstream side and the downstream side, a tip end portion (contact portion) of the seal portion may be brought to make further close contact with the inner wall surface of the air intake port so that the excellent sealing ability may be maintained. In addition, even in a case where the magnitude correlation between the pressure at the upstream side and the pressure at the downstream side is reversed due to the air intake pulsation, the other of the first portion and the second portion is elastically deformable in the direction further expanding outwardly to thereby maintain the excellent sealing ability. That is, because of the first portion and the second portion, the elastic deformation where the first portion expands outwardly and the elastic deformation where the second portion expands outwardly are simply exchanged with each other when the magnitude correlation between the pressure at the upstream side and the pressure at the downstream side is reversed (i.e., the direction of the force applied to the seal portion by the pressure difference is reversed). The excellent sealing ability may be maintained by either one of the aforementioned two elastic deformations.

In addition, because the seal portion is formed in the bending configuration including the first portion and the second portion being elastically deformable, the seal portion is easily elastically deformable. Not only in a case where the pressure difference between the upstream side and the downstream side is large but also in a case where the pressure difference between the upstream side and the downstream side is small, the seal portion is easily elastically deformable in a direction where the tip end portion of the seal portion is pressed against the inner wall surface of the air intake port by the force applied to the seal portion resulting from the aforementioned pressure difference. As a result, regardless of the magnitude of the pressure difference between the upstream side and the downstream side, the excellent sealing is obtainable.

In addition, in the air intake control valve according to the other construction, preferably, the seal portion is configured so that the second portion makes contact with the inner wall surface of the air intake port in a further closely contacting state by an application of a force in a direction in which the first portion or the second portion is elastically deformed by a pressure difference between an upstream side and a downstream side in the state where the valve body is at the closed position. Accordingly, in a case where the pressure difference exists between the upstream side and the downstream side, the force applied to the seal portion resulting from the pressure difference is effectively utilized to improve the sealing ability between the inner wall surface of the air intake port and the valve body, which may easily maintain the excellent sealing ability.

Effects of Invention

According to the present invention, as mentioned above, even in a case where the pressure difference exists between the upstream side and the downstream side, the sealing ability may be excellently maintained.

BRIEF DESCRIPTION OF DRAWINGS

FIG. 5 is a cross-sectional view illustrating a valve body of the air intake apparatus according to the first embodiment, FIG. 6 is a cross-sectional view illustrating a state where the valve body of the air intake apparatus is positioned at a closed position according to the first embodiment of the present invention, FIG. 7 is a cross-sectional view illustrating a first seal portion in a state where a pressure at a downstream side is lower than a pressure at an upstream side at the closed position of the valve body of the air intake apparatus according to the first embodiment of the present invention, FIG. 8 is a cross-sectional view illustrating a second seal portion in a state where the pressure at the downstream side is lower than the pressure at the upstream side at the closed position of the valve body of the air intake apparatus according to the first embodiment of the present invention, FIG. 9 is a cross-sectional view illustrating the first seal portion in a state where the pressure at the upstream side is lower than the pressure at the downstream side at the closed position of the valve body of the air intake apparatus according to the first embodiment of the present invention, FIG. 10 is a cross-sectional view illustrating the second seal portion in a state where the pressure at the upstream side is lower than the pressure at the downstream side at the closed position of the valve body of the air intake apparatus according to the first embodiment of the present invention, FIG. 13 is a cross-sectional view illustrating the first seal portion in a state where the pressure at the downstream side is lower than the pressure at the upstream side at the closed position of the valve body of the air intake apparatus according to the second embodiment of the present invention, FIG. 14 is a cross-sectional view illustrating the second seal portion in a state where the pressure at the downstream side is lower than the pressure at the upstream side at the closed position of the valve body of the air intake apparatus according to the second embodiment of the present invention, FIG. 15 is a cross-sectional view illustrating the first seal portion in a state where the pressure at the upstream side is lower than the pressure at the downstream side at the closed position of the valve body of the air intake apparatus according to the second embodiment of the present invention, and FIG. 16 is a cross-sectional view illustrating the second seal portion in a state where the pressure at the upstream side is lower than the pressure at the downstream side at the closed position of the valve body of the air intake apparatus according to the second embodiment of the present invention.

MODE FOR CARRYING OUT THE INVENTION

Embodiments of the present invention are explained below with reference to drawings.

[First Embodiment] A construction of an air intake apparatus 100 according to the first embodiment of the present invention is explained with reference to FIGS. 1 to 8.

Figure 1:
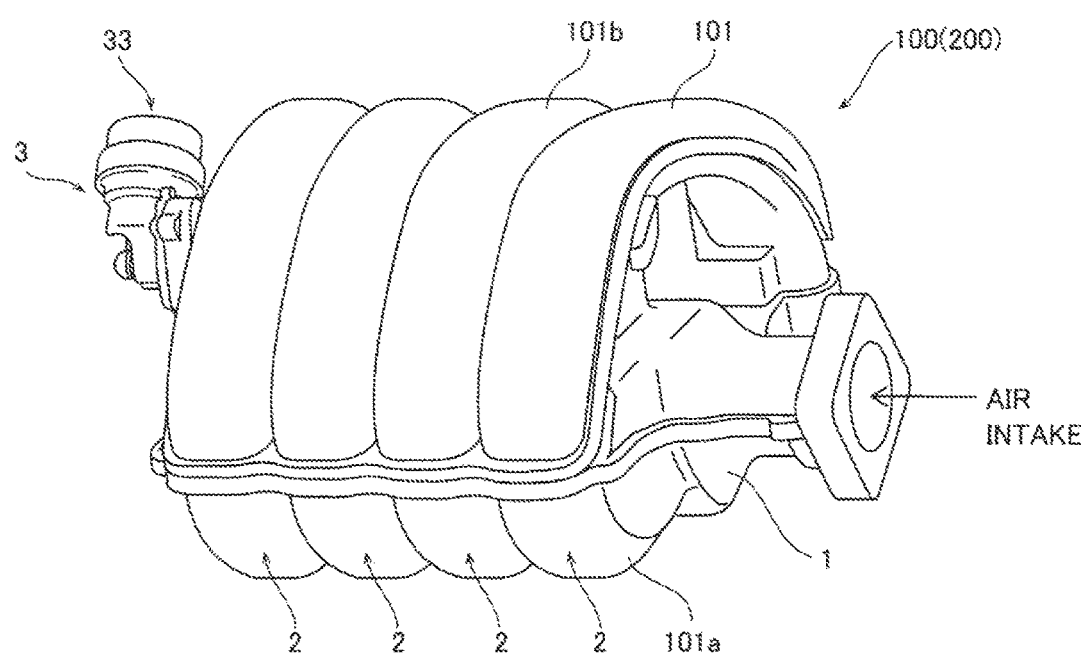
FIG. 1 is a perspective view illustrating a construction of an air intake apparatus according to first and second embodiments of the present invention.
Figure 2:
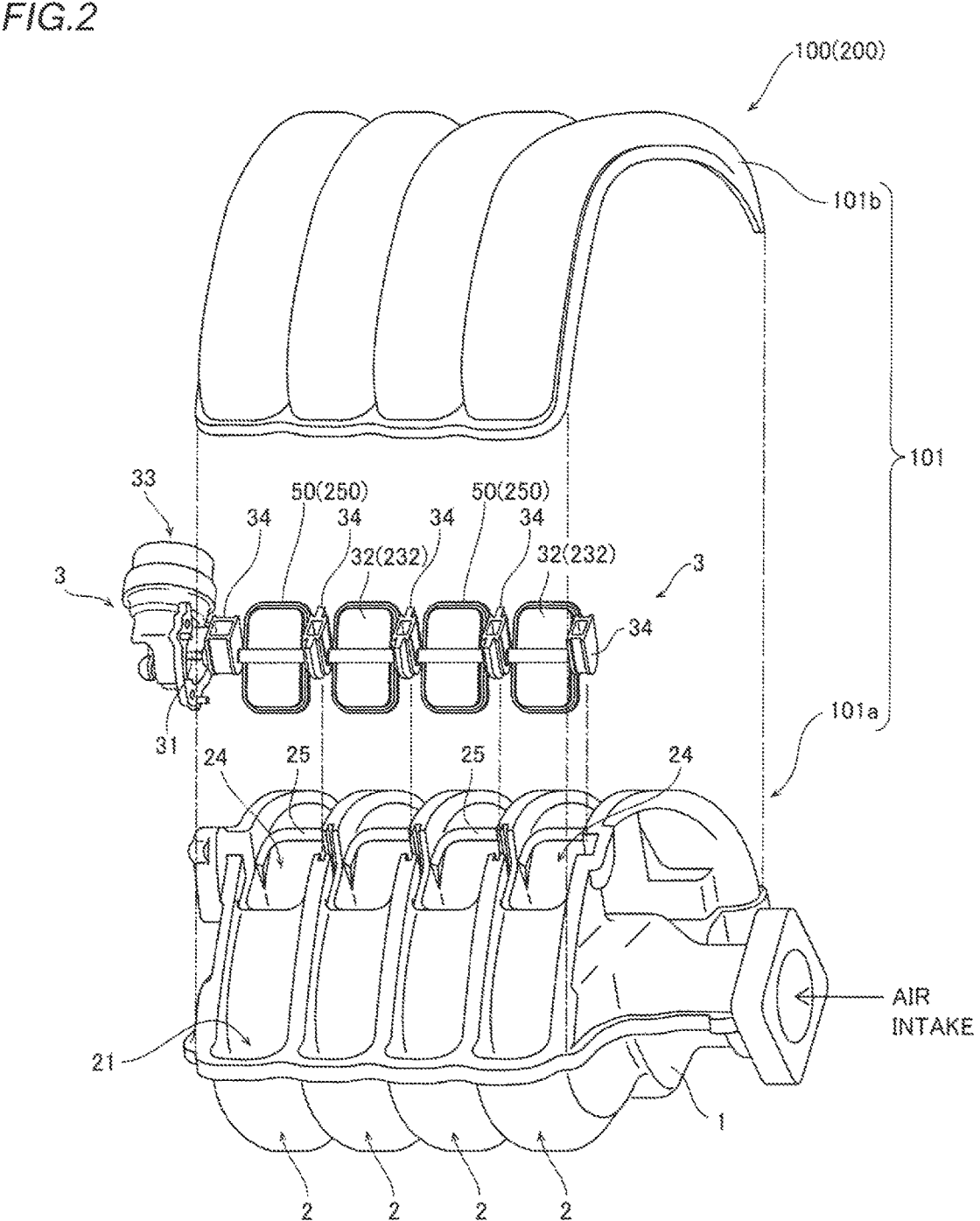
FIG. 2 is an exploded perspective view illustrating the construction of the air intake apparatus according to the first and second embodiments of the present invention.
Figure 3:
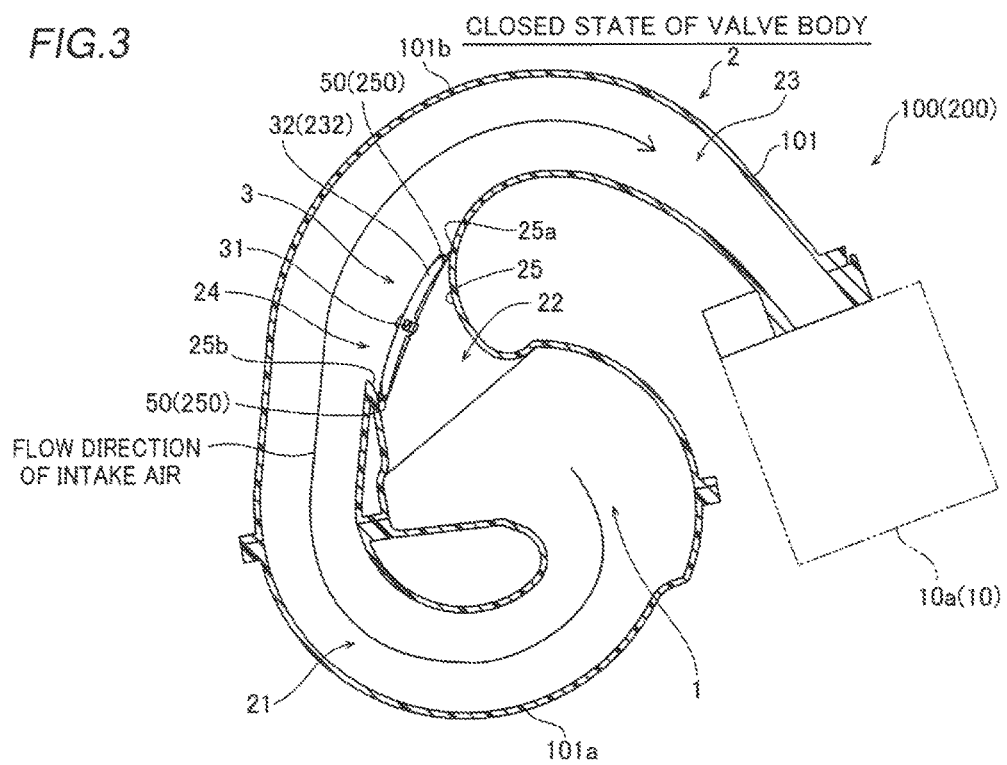
FIG. 3 is a cross-sectional view illustrating a closed state of an air intake control valve of the air intake apparatus according to the first and second embodiments of the present invention.
Figure 4:
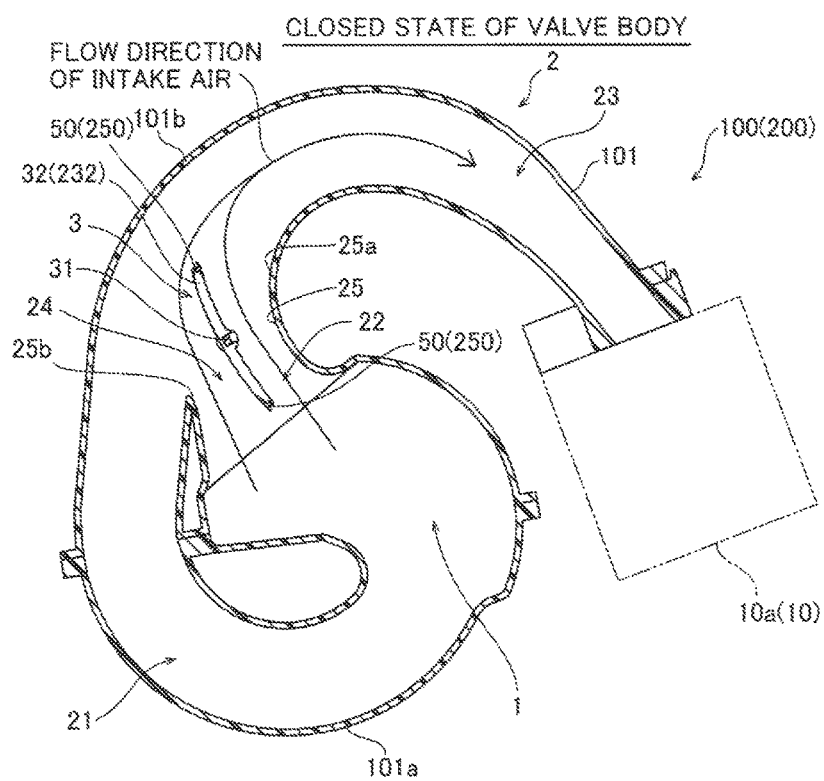
FIG. 4 is a cross-sectional view illustrating an open state of the air intake control valve of the air intake apparatus according to the first and second embodiments of the present invention.

The air intake apparatus 100 according to the first embodiment of the present invention serves as an air intake apparatus mounted at an in-line four cylinder engine 10 for an automobile (refer to FIGS. 3 and 4). The air intake apparatus 100 includes a surge tank 1, four air intake ports 2 branched from the surge tank 1 to be arranged at a downstream of the surge tank 1, and an air intake control valve 3 provided at respective inner portions of the four air intake ports 2. In addition, the air intake apparatus 100 structurally includes an air intake apparatus body 101 integrally including the surge tank 1 and the four air intake ports 2. As illustrated in FIGS. 2 to 4, the air intake control valve 3 is provided at an inner portion of the air intake apparatus body 101. The air intake apparatus body 101 includes a body-side portion 101a and a cover portion 101b. The body-side portion 101a and the cover portion 101b are integrally joined to each other by vibration welding in a state where the air intake control valve 3 is mounted at the body-side portion 101a. The air intake apparatus 100 is connected to a cylinder head 10a as illustrated in FIGS. 3 and 4. The four air intake ports 2 are connected to respective cylinders via the cylinder head 10a.

An intake air reaches the surge tank 1 via an air cleaner and a throttle which are not shown to flow into the surge tank 1. Each of the four air intake ports 2 includes a first port portion 21, a second port portion 22, and an outlet port 23 connected to the cylinder of the engine 10 at a downstream side of the first port portion 21 and the second port portion 22. The first port portion 21 extends from the surge tank 1 in a bypass manner to be connected to the outlet port 23 at the downstream side. The second port portion 22 is provided to connect the surge tank 1 and the outlet port 23 via the air intake control valve 3. As illustrated in FIG. 6, contact surfaces 25a and 25b are formed at an inner wall surface 25 of an opening portion 24 that is positioned at a connection portion between the second port portion 22 and the outlet port 23. In a case where the air intake control valve 3 is closed, a seal portion 50, which is explained later, of the air intake control valve 3 makes contact with the contact surfaces 25a and 25b. The contact surfaces 25a and 25b are both configured by inclination surfaces formed along a flow direction of intake air flowing from the second port portion 22 towards the outlet port 23 in a state where a valve body 32 is opened (refer to FIG. 4). Each of the contact surfaces 25a and 25b is an example of a first inclination surfaces.

The air intake control valve 3 is configured to open and close the opening portion 24 positioned at the connection portion between the second port portion 22 and the outlet port 23. In a state where the air intake control valve 3 is closed, as illustrated in FIG. 3, a long port including a large air intake path length is formed by the first port portion 21 and the outlet port 23. In a state where the air intake control valve 3 is opened, as illustrated in FIG. 4, a short port including a small air intake path length is formed by the second port portion 22 and the outlet port 23. Accordingly, the air intake control valve 3 is configured to change the air intake path length. That is, the air intake control valve 3 functions as an air intake control valve for variable air intake changing the air intake path length to each of the cylinders of the engine 10. Accordingly, the air intake path length is changed depending on engine revolutions or engine load, for example, so that further appropriate volume of intake air may be supplied to the engine 10.

In addition, as illustrated in FIG. 2, the air intake control valve 3 includes a rotation shaft 31 provided to penetrate through the second port portions 22 of the four air intake ports 2, the valve bodies 32 provided at the rotation shaft 31 for opening and closing the second port portions 22, and an actuator 33 rotating the rotation shaft 31. The actuator 33 is a direct-drive type negative pressure actuator generating a driving force in a linear direction by a supply of negative pressure.

The valve bodies 32 are provided at the four air intake ports 2, respectively (i.e., four valve bodies 32 in total). Each of the valve bodies 32 includes a configuration in a substantially rectangular form conforming to the opening portion 24 of the second port portion 22. The valve body 32 is formed in a plate form. The common rotation shaft 31 is inserted into the four valve bodies 32 so as to intersect a center portion in a longitudinal direction thereof. Each of the four valve bodies 32 is configured to rotate around the rotation shaft 31 between an open position and a closed position. The four valve bodies 32 are configured to open and close in synchronization with one another by integrally rotating with the rotation shaft 31. A shaft portion (not shown) of which outer peripheral surface is in an arc form is provided at a center portion of the valve body 32 in a longitudinal direction thereof so as to protrude to respective sides of the valve body 32. The shaft portion of the valve body 32 is inserted to bearing members 34 arranged at respective sides of the valve body 32 so that the bearing members 34 sandwich the valve body 32. Accordingly, the valve body 32 is rotatably supported by the bearing members 34. The valve body 32 is formed in an arch so as to conform to the configuration of the air intake port 2 that extends in a curved manner at the closed position. Accordingly, an air intake resistance by the valve body 32 at the closed position is reduced so that a pressure loss of intake air flowing through the air intake port 2 can be restrained from increasing.

Here, in the first embodiment, as illustrated in FIG. 5, the seal portion 50 is mounted to an outer peripheral portion 32a of the valve body 32 for sealing between the inner wall surface 25 (refer to FIGS. 3 and 4) of the opening portion 24 of the second port portion 22 and the valve body 32. The seal portion 50, which is made of rubber, is configured to be elastically deformable. The seal portion 50 includes a first seal portion 50a mounted to one side (i.e., a side close to the cylinder of the engine 10) of the outer peripheral portion 32a of the valve body 32 in a direction orthogonal to the rotation shaft 31 and a second seal portion 50b mounted to the other side (i.e., a side away from the cylinder of the engine 10) of the outer peripheral portion 32a of the valve body 32 in the direction orthogonal to the rotation shaft 31. The first seal portion 50a and the second seal portion 50b are configured as separate bodies from each other.

As illustrated in FIG. 6, the first seal portion 50a is configured to seal between the inner wall surface 25 of the second port portion 22 and the valve body 32 by making contact with the contact surface 25a of the inner wall surface 25 of the second port portion 22 in a state where the valve body 32 is at the closed position. The second seal portion 50b is configured to seal between the inner wall surface 25 of the second port portion 22 and the valve body 32 by making contact with the contact surface 25b of the inner wall surface 25 of the opening portion 24 of the second port portion 22 in the state where the valve body 32 is at the closed position. The contact directions of the first seal portion 50a and the second seal portion 50b relative to the inner wall surface 25 of the second port portion 22 are opposite from each other. In addition, the first seal portion 50a (the second seal portion 50b) is formed in a bending configuration including a first hinge portion 51a (51b) and a second hinge portion 52a (52b) serving as supporting points upon elastic deformation of the first seal portion 50a (the second seal portion 50b). Specifically, the first hinge portion 51a and the second hinge portion 52a of the first seal portion 50a are disposed at other surface 32c side (surge tank 1 side) and one surface 32b side (outlet port 23 side) of the valve body 32 at the outer peripheral portion 32a of the valve body 32 respectively. The first hinge portion 51b and the second hinge portion 52b of the second seal portion 50b are disposed at the one surface 32b side (outlet port 23 side) and the other surface 32c side (surge tank 1 side) of the valve body 32 at the outer peripheral portion 32a of the valve body 32 respectively. That is, the first hinge portion 51a and the second hinge portion 52a of the first seal portion 50a are arranged at the upstream side and the downstream side of the air intake port 2, respectively, in the state where the valve body 32 is at the closed position as illustrated in FIG. 6. The first hinge portion 51b and the second hinge portion 52b of the second seal portion 50b are arranged at the downstream side and the upstream side of the air intake port 2, respectively, in the state where the valve body 32 is at the closed position.

The first seal portion 50a (the second seal portion 50b) includes a connection portion 53a (53b) being elastically deformable to connect the first hinge portion 51a (51b) and the second hinge portion 52a (52b), and a contact portion 54a (54b) being elastically deformable to extend outwardly from the second hinge portion 52a (52b). In other words, the first seal portion 50a (the second seal portion 50b) is formed in a bending configuration in a letter-V shape by the connection portion 53a (53b) and the contact portion 54a (54b). In addition, the first seal portion 50a and the second seal portion 50b include letter-V configurations which are opposite from each other. Then, the first hinge portion 51a (51b) is provided at one end of the bending configuration in the letter-V shape facing the valve body 32 while the second hinge portion 52a (52b) is provided at a halfway return point of the bending configuration in the letter-V shape. That is, the connection portion 53a (53b) and the contact portion 54a (54b) are connected to each other via the second hinge portion 52a (52b). The first seal portion 50a (the second seal portion 50b) is mounted to the outer peripheral portion 32a of the valve body 32 in a state where an attachment portion 55a (55b) connected via the first hinge portion 51a (51b) is bonded by vulcanization to a side end surface of the outer peripheral portion 32a, the one surface 32b and the other surface 32c of the valve body 32. The first seal portion 50a (the second seal portion 50b) includes a length L1 (L2) in a thickness direction of the valve body 32 equal to or smaller than a thickness T1 of the valve body 32 in a plate form.

The connection portion 53a (53b) of the first seal portion 50a (the second seal portion 50b) is formed so that a tip end portion side protrudes towards the one surface 32b (the other surface 32c) of the valve body 32. The contact portion 54a (54b) is formed so that a tip end portion side protrudes towards the other surface 32c (the one surface 32b) of the valve body 32. That is, the connection portion 53a (53b) protrudes towards a rotation direction in a case where the valve body 32 is brought to the closed position and the contact portion 54a (54b) protrudes towards an opposite direction from the rotation direction in a case where the valve body 32 is brought to the closed position. As illustrated in FIG. 5, a folding portion 56a (56b) folded inwardly is integrally formed at a tip end portion of the contact portion 54a (54b). Thus, as illustrated in FIG. 6, when the valve body 32 is brought to the closed position, an outer surface of the contact portion 54a (54b) is smoothly brought to contact the contact surface 25a (25b) of the inner wall surface 25 of the opening portion 24 so that the contact portion 54a (54b) may be positioned between the connection portion 53a (53b) and the contact surface 25a (25b). In addition, the contact portion 54a (54b) of the first seal portion 50a (the second seal portion 50b) includes a greater length than the connection portion 53a (53b).

The first seal portion 50a (the second seal portion 50b) is configured so that the contact portion 54a (54b) makes contact with the contact surface 25a (25b) of the inner wall surface 25 of the opening portion 24 in a case where the valve body 32 rotates to the closed position. In a case where a pressure difference exists between the one surface 32b side (the downstream side of the air intake port 2) and the other surface 32c side (the upstream side of the air intake port 2) of the valve body 32 in the state where the valve body 32 is at the closed position, the first seal portion 50a (the second seal portion 50b) is configured so that the contact portion 54a (54b) makes contact with the contact surface 25a (25b) of the inner wall surface 25 of the opening portion 24 in a further closely contacting state by an application of a force causing the connection portion 53a (53b) or the contact portion 54a (54b) to be elastically deformed with reference to the first hinge portion 51a (51b) or the second hinge portion 52a (52b) serving as the supporting point by the aforementioned pressure difference.

Specifically, in a case where the pressure at the one surface 32b side (the downstream side of the air intake port 2) of the valve body 32 is lower than the pressure at the other surface 32c side (the upstream side of the air intake port 2), as illustrated in FIG. 7, the first seal portion 50a is configured so that the contact portion 54a makes contact with the contact surface 25a of the inner wall surface 25 of the opening portion 24 in a further closely contacting state by an application of a force causing the contact portion 54a to be elastically deformed outwardly with reference to the second hinge portion 52a serving as the supporting point by the aforementioned pressure difference. In a case where the pressure at the one surface 32b side of the valve body 32 is lower than the pressure at the other surface 32c side, as illustrated in FIG. 8, the second seal portion 50b is configured so that the contact portion 54b makes contact with the contact surface 25b of the inner wall surface 25 of the opening portion 24 in a further closely contacting state by an application of a force causing the connection portion 53b to be elastically deformed in a direction where the connection portion 53b expands outwardly with reference to the first hinge portion 51b serving as the supporting point by the aforementioned pressure difference.

In a case where the pressure at the other surface 32c side (the upstream side of the air intake port 2) of the valve body 32 becomes lower than the pressure at the one surface 32b side (the downstream side of the air intake port 2) by an air intake pulsation, as illustrated in FIG. 9, the first seal portion 50a is configured so that the contact portion 54a makes contact with the contact surface 25a of the inner wall surface 25 of the opening portion 24 in a further closely contacting state by an application of a force causing the connection portion 53a to be elastically deformed in a direction where the connection portion 53a expands outwardly with reference to the first hinge portion 51a serving as the supporting point by the aforementioned pressure difference. In a case where the pressure at the other surface 32c side of the valve body 32 becomes lower than the pressure at the one surface 32b side by the air intake pulsation, as illustrated in FIG. 10, the second seal portion 50b is configured so that the contact portion 54b makes contact with the contact surface 25b of the inner wall surface 25 of the opening portion 24 in a further closely contacting state by an application of a force causing the contact portion 54b to be elastically deformed outwardly with reference to the second hinge portion 52b serving as the supporting point by the aforementioned pressure difference.

Next, deformation states of the first seal portion 50a and the second seal portion 50b in a case where the pressure at the one surface 32b side (the downstream side of the air intake port 2) of the valve body 32 is lower than the pressure at the other surface 32c side (the upstream side of the air intake port 2) in the state where the valve body 32 is at the closed position are explained with reference to FIGS. 6 to 8. Generally, in a case where the valve body 32 is in the closed state, a flow speed of intake air at the air intake port 2 side is faster than a flow speed at the surge tank 1 side. Thus, the pressure at the one surface 32b side (the downstream side of the air intake port 2) of the valve body 32 becomes lower than the pressure at the other surface 32c side (the upstream side of the air intake port 2) of the valve body 32.

In a case where the valve body 32 rotates to the closed position, as illustrated in FIG. 6, the contact portion 54a (54b) of the first seal portion 50a (the second seal portion 50b) makes contact with the contact surface 25a (25b) of the inner wall surface 25 of the opening portion 24 to thereby seal between the valve body 32 and the inner wall surface 25 of the opening portion 24. In the aforementioned state, in a case where the pressure at the one surface 32b side (the downstream side of the air intake port 2) of the valve body 32 is lower than the pressure at the other surface 32c side (the upstream side of the air intake port 2), as illustrated in FIG. 7, the connection portion 53a receives the force (refer to arrows in FIG. 7) causing the connection portion 53a to be elastically deformed inwardly with reference to the first hinge portion 51a serving as the supporting point by the aforementioned pressure difference so that the connection portion 53a makes contact with the attachment portion 55a. Accordingly, the movement of the second hinge portion 52a to the inner side is restricted. Then, in a state where the movement of the second hinge portion 52a to the inner side is restricted, the contact portion 54a of the first seal portion 50a receives the force (refer to the arrows in FIG. 7) causing the contact portion 54a to be elastically deformed outwardly with reference to the second hinge portion 52a serving as the supporting point by the aforementioned pressure difference so that the contact portion 54a makes further close contact with the contact surface 25a. Accordingly, in a case where the pressure at the one surface 32b side (the downstream side of the air intake port 2) of the valve body 32 is lower than the pressure at the other surface 32c side (the upstream side of the air intake port 2), a portion between the valve body 32 and the inner wall surface 25 of the second port portion 22 is excellently sealed at one side of the outer peripheral portion 32a of the valve body 32 in the direction orthogonal to the rotation shaft 31.

On the other hand, the connection portion 53b of the second seal portion 50b receives the force (refer to arrows in FIG. 8) causing the connection portion 53b to be elastically deformed outwardly with reference to the first hinge portion 51b serving as the supporting point by the aforementioned pressure difference so that the connection portion 53b is pressed against the contact portion 54b. Then, the contact portion 54b of the second seal portion 50b receives the force (refer to the arrows in FIG. 8) causing the contact portion 54b to be elastically deformed outwardly via the connection portion 53b so that the contact portion 54b makes further close contact with the contact surface 25b. Accordingly, in a case where the pressure at the one surface 32b side (the downstream side of the air intake port 2) of the valve body 32 is lower than the pressure at the other surface 32c side (the upstream side of the air intake port 2), a portion between the valve body 32 and the inner wall surface 25 of the second port portion 22 is excellently sealed at the other side of the outer peripheral portion 32a of the valve body 32 in the direction orthogonal to the rotation shaft 31.

Next, the deformation states of the first seal portion 50a and the second seal portion 50b in a case where the pressure at the other surface 32c side (the upstream side of the air intake port 2) of the valve body 32 becomes lower than the pressure at the one surface 32b side (the downstream side of the air intake port 2) by the air intake pulsation in the state where the valve body 32 is at the closed position is explained with reference to FIGS. 6, 9 and 10. In this case, as compared to the case where the pressure at the one surface 32b side of the valve body 32 is lower than the pressure at the other surface 32c side, the reversed deformation states between the first seal portion 50a side and the second seal portion 50b side are obtained. In the following, a detailed explanation is made.

In a case where the valve body 32 rotates to the closed position, as illustrated in FIG. 6, the contact portion 54a (54b) of the first seal portion 50a (50b) makes contact with the contact surface 25a (25b) of the inner wall surface 25 of the opening portion 24 to seal between the valve body 32 and the inner wall surface 25. In the aforementioned state, in a case where the pressure at the other surface 32c side (the upstream side of the air intake port 2) of the valve body 32 becomes lower than the pressure at the one surface 32b side (the downstream side of the air intake port 2) by the air intake pulsation, as illustrated in FIG. 9, the connection portion 53a of the first seal portion 50a receives the force (refer to arrows in FIG. 9) causing the connection portion 53a to be elastically deformed outwardly with reference to the first hinge portion 51a serving as the supporting point by the aforementioned pressure difference so that the connection portion 53a is pressed against the contact portion 54a. Then, the contact portion 54a of the first seal portion 50a receives the force (refer to the arrows in FIG. 9) causing the contact portion 54a to be elastically deformed outwardly via the connection portion 53a so that the contact portion 54a makes further close contact with the contact surface 25a. Accordingly, in a case where the pressure at the other surface 32c side (the upstream side of the air intake port 2) of the valve body 32 becomes lower than the pressure at the one surface 32b side (the downstream side of the air intake port 2) by the air intake pulsation, the portion between the valve body 32 and the inner wall surface 25 of the second port portion 22 is excellently sealed at one side of the outer peripheral portion 32a of the valve body 32 in the direction orthogonal to the rotation shaft 31.

On the other hand, as illustrated in FIG. 10, the connection portion 53b of the second seal portion 50b receives the force (refer to arrows in FIG. 10) causing the connection portion 53b to be elastically deformed inwardly with reference to the first hinge portion 51b serving as the supporting point by the pressure difference so that the connection portion 53b makes contact with the attachment portion 55b. Accordingly, the movement of the second hinge portion 52b to the inner side is restricted. In a state where the movement of the second hinge portion 52b to the inner side is restricted, the contact portion 54b of the second seal portion 50b receives the force (refer to the arrows in FIG. 10) causing the contact portion 54b to be elastically deformed outwardly with reference to the second hinge portion 52b serving as the supporting point by the pressure difference so that the contact portion 54b makes contact with the contact surface 25b in a further closely contacting state. Accordingly, in a case where the pressure at the other surface 32c side (the upstream side of the air intake port 2) of the valve body 32 becomes lower than the pressure at the one surface 32b side (the downstream side of the air intake port 2) by the air intake pulsation, the portion between the valve body 32 and the inner wall surface 25 of the second port portion 22 is also excellently sealed at the other side of the outer peripheral portion 32a of the valve body 32 in the direction orthogonal to the rotation shaft 31.

In the first embodiment, as mentioned above, the seal portion 50 is formed in the bending configuration including the first hinge portion 51a (51b) and the second hinge portion 52a (52b) serving as the supporting points upon elastic deformation of the seal portion 50. One of the first hinge portion 51a (51b) and the second hinge portion 52a (52b) is disposed at the upstream side of the air intake port 2 and the other is disposed at the downstream side in the state where the valve body 32 is at the closed position. Accordingly, the seal portion 50 is bent at the first hinge portion 51a (51b) and the second hinge portion 52a (52b) in different directions from each other. In a case where the pressure difference exits between the one surface 32b side (the downstream side of the air intake port 2) and the other surface 32c side (the upstream side of the air intake port 2) when the valve body 32 is at the closed position and the force is applied to the seal portion 50 by the aforementioned pressure difference, the seal portion 50 is elastically deformable in the direction further expanding outwardly with reference to one of the first hinge portion 51a (51b) and the second hinge portion 52a (52b). As a result, even in a case where the pressure difference exists between the upstream side and the downstream side, the tip end portion of the seal portion 50 (the contact portion 54a (54b)) may be brought to make further close contact with the inner wall surface 25 of the air intake port 2, which may excellently maintain the sealing ability.

In addition, even in a case where a magnitude correlation between the pressure at the one surface 32b side (the downstream side of the air intake port 2) of the valve body 32 and the pressure at the other surface 32c side (the upstream side of the air intake port 2) is reversed resulting from the air intake pulsation, the seal portion 50 is elastically deformable in the direction further expanding outwardly with reference to the other of the first hinge portion 51a (51b) and the second hinge portion 52a (52b), which may excellently maintain the sealing ability. That is, because the first hinge portion 51a (51b) and the second hinge portion 52a (52b) are provided at the seal portion 50, even when the magnitude correlation in the pressure difference between the upstream side and the downstream side is reversed (i.e., direction of the force acting on the seal portion 50 by the pressure difference is reversed), the elastic deformation to the outer side with reference to the first hinge portion 51a (51b) serving as the supporting point and the elastic deformation to the outer side with reference to the second hinge portion 52a (52b) serving as the supporting point are simply exchanged with each other. The sealing ability may be maintained excellently by one of the aforementioned two elastic deformations.

In addition, because of the seal portion 50 formed in the bending configuration including the first hinge portion 51a (51b) and the second hinge portion 52a (52b), the seal portion 50 is easily elastically deformable with reference to the first hinge portion 51a (51b) and the second hinge portion 52a (52b) serving as the supporting points. Thus, not only in a case where the pressure difference between the upstream side and the downstream side is large but also in a case where the pressure difference between the upstream side and the downstream side is small, the seal portion 50 is easily elastically deformable in the direction where the tip end portion (the contact portion 54a (54b)) of the seal portion 50 is pressed against the inner wall surface 25 of the air intake port 2. As a result, regardless of the magnitude of pressure difference between the upstream side and the downstream side, the excellent sealing is obtainable.

In the first embodiment, as mentioned above, the force is applied in the direction where either the connection portion 53a (53b) or the contact portion 54a (54b) is elastically deformed with reference to either the first hinge portion 51a (51b) or the second hinge portion 52a (52b) by the pressure difference between the one surface 32b side (the downstream side of the air intake port 2) of the valve body 32 and the other surface 32c side (the upstream side of the air intake port 2) when the valve body 32 is at the closed position so that the contact portion 54a (54b) is configured to make contact with the inner wall surface 25 of the air intake port 2 in a further closing contact state. Accordingly, in a case where the pressure difference exists between the upstream side and the downstream side, the force added to the seal portion 50 by the pressure difference is effectively utilized to further increase the sealing ability between the inner wall surface 25 of the air intake port 2 and the valve body 32, which may excellently maintain the sealing ability.

In addition, in the first embodiment as mentioned above, the seal portion 50 is formed in the bending configuration in the letter-V shape by the connection portion 53a (53b) and the contact portion 54a (54b). In addition, the first hinge portion 51a (51b) and the second hinge portion 52a (52b) are provided at one end and the halfway return point of the bending configuration in the letter-V shape, respectively. Accordingly, with the usage of the seal portion 50 in the letter-V form obtained by the connection portion 53a (53b) and the contact portion 54a (54b), the sealing ability in a case where the pressure difference exists between the upstream side and the downstream side is improvable.

In addition, in the first embodiment as mentioned above, the seal portion 50 is configured to include the length L1 in the thickness direction of the valve body 32 equal to or smaller than the thickness T1 of the valve body 32 in the plate form. Accordingly, the seal portion 5 may be formed so as not to protrude in the thickness direction of the valve body 32 at the outer peripheral portion 32a of the valve body 32 in the plate form. As compared to a case where the seal portion 50 protrudes in the thickness direction of the valve body 32, the air intake resistance by the seal portion 50 may be reduced. As a result, in a case where the seal portion 50 including the first hinge portion 51a (51b) and the second hinge portion 52a (52b) is provided, the pressure loss of intake air flowing through the air intake port 2 may be restrained from increasing.

In addition, in the first embodiment as mentioned above, the first seal portion 50a where the first hinge portion 51a is disposed at the other surface 32c side (the upstream side of the air intake port 2) of the valve body 32 while the second hinge portion 52a is disposed at the one surface 32b side (the downstream side of the air intake port 2) of the valve body 32 is provided at a portion at one side of the outer peripheral portion 32a of the valve body 32 in the direction orthogonal to the rotation shaft 31 of the valve body 32. Then, the second seal portion 50b where the first hinge portion 51b is disposed at the one surface 32b side (the downstream side of the air intake port 2) of the valve body 32 while the second hinge portion 52b is disposed at the other surface 32c side (the upstream side of the air intake port 2) of the valve body 32 is provided at a portion at the other side of the outer peripheral portion 32a of the valve body 32 in the direction orthogonal to the rotation shaft 31 of the valve body 32. Accordingly, the first seal portion 50a and the second seal portion 50b formed so that the positions of the first hinge portion 51a and the second hinge portion 52a of the first seal portion 50a are reversed from the positions of the first hinge portion 51b and the second hinge portion 52b of the second seal portion 50b are provided at one side and the other side of the outer peripheral portion 32a of the valve body 32 in the direction orthogonal to the rotation shaft 31 of the valve body 32, respectively. As in the first embodiment, in a case where the contact direction of the seal portion 50 relative to the inner wall surface 25 of the air intake port 2 differs between one side and the other side of the valve body 32, the seal portion 50 in the form conforming to the contact direction may be provided at both of one side and the other side of the valve body 32. As a result, the sealing ability in a case where the pressure difference exists between the upstream side and the downstream side is improvable.

In addition, in the first embodiment as mentioned above, in a case where the pressure at the one surface 32b side (the downstream side of the air intake port 2) of the valve body 32 is lower than the pressure at the other surface 32c side (the upstream side of the air intake port 2) of the valve body 32 when the valve body 32 is at the closed position, the first seal portion 50a is configured so that the contact portion 54a makes contact with the inner wall surface 25 of the air intake port 2 in a further closely contacting state by the application of the force causing the contact portion 54a to be elastically deformed outwardly with reference to the second hinge portion 52a serving as the supporting point by the aforementioned pressure difference. Then, in a case where the pressure at the one surface 32b side (the downstream side of the air intake port 2) of the valve body 32 is lower than the pressure at the other surface 32c side (the upstream side of the air intake port 2) of the valve body 32 when the valve body 32 is at the closed position, the second seal portion 50b is configured so that the contact portion 54b makes contact with the inner wall surface 25 of the air intake port 2 in a further closely contacting state by the application of the force causing the connection portion 53b to be elastically deformed in the direction where the connection portion 53b expands outwardly with reference to the first hinge portion 51b serving as the supporting point by the aforementioned pressure difference. Accordingly, in a case where the pressure at the one surface 32b side (the downstream side of the air intake port 2) of the valve body 32 is lower than the pressure at the other surface 32c side (the upstream side of the air intake port 2) of the valve body 32, at the first seal portion 50a, the contact portion 54a makes contact with the inner wall surface 25 of the air intake port 2 in a further closely contacting state by the application of the force causing the contact portion 54a to be elastically deformed outwardly with reference to the second hinge portion 52a serving as the supporting point. In addition, at the second seal portion 50b, the contact portion 54b makes contact with the inner wall surface 25 of the air intake port 2 in a further closely contacting state by the application of the force causing the connection portion 53b to be elastically deformed in the direction where the connection portion 53b expands outwardly. Therefore, in the construction of the first embodiment where the first seal portion 50a and the second seal portion 50b formed so that the positions of the first hinge portion 51a and the second hinge portion 52a of the first seal portion 50a are reversed from the positions of the first hinge portion 51b and the second hinge portion 52b of the second seal portion 50b are provided, the sealing ability may be excellently maintained in a case where the pressure at the one surface 32b side (the downstream side of the air intake port 2) of the valve body 32 is lower than the pressure at the other surface 32c side (the upstream side of the air intake port 2) of the valve body 32.

In addition, in the first embodiment as mentioned above, in a case where the pressure at the other surface 32c side (the upstream side of the air intake port 2) of the valve body 32 becomes lower than the pressure at the one surface 32b side (the downstream side of the air intake port 2) by the air intake pulsation when the valve body 32 is at the closed position, the first seal portion 50a is configured so that the contact portion 54a makes contact with the inner wall surface 25 of the air intake port 2 in a further closely contacting state by the application of the force causing the connection portion 53a to be elastically deformed in the direction where the connection portion 53a expands outwardly with reference to the first hinge portion 51a serving as the supporting point by the pressure difference. Then, in a case where the pressure at the other surface 32c side (the upstream side of the air intake port 2) of the valve body 32 becomes lower than the pressure at the one surface 32b side (the downstream side of the air intake port 2) by the air intake pulsation when the valve body 32 is at the closed position, the second seal portion 50b is configured so that the contact portion 54b makes contact with the inner wall surface 25 of the air intake port 2 in a further closely contacting state by the application of the force causing the contact portion 54b to be elastically deformed outwardly with reference to the second hinge portion 52b serving as the supporting point by the pressure difference. Accordingly, in the construction of the first embodiment where the first seal portion 50a and the second seal portion 50b formed so that the positions of the first hinge portion 51a and the second hinge portion 52a of the first seal portion 50a are reversed from the positions of the first hinge portion 51b and the second hinge portion 52b of the second seal portion 50b are provided, the sealing ability may be excellently maintained at both of one side and the other side of the outer peripheral portion 32a of the valve body 32 in the direction orthogonal to the rotation shaft 31 of the valve body 32 not only in a case where the pressure at the one surface 32b side (the downstream side of the air intake port 2) of the valve body 32 is lower than the pressure at the other surface 32c side (the upstream side of the air intake port 2) of the valve body 32 but also in a case where the magnitude correlation between the pressure at the one surface 32b side (the downstream side of the air intake port 2) of the valve body 32 and the pressure at the other surface 32c side (the upstream side of the air intake port 2) is reversed.

[Second Embodiment] Next, an air intake apparatus 200 according to the second embodiment of the present invention is explained with reference to FIGS. 11 to 16. In the second embodiment, being different from the first embodiment, a construction where a first hinge portion 251a (251b) of a first seal portion 250a (a second seal portion 250b) of a seal portion 250 is arranged at one surface 232b side (other surface 232c side) of a valve body 232 is explained.

Figure 11:
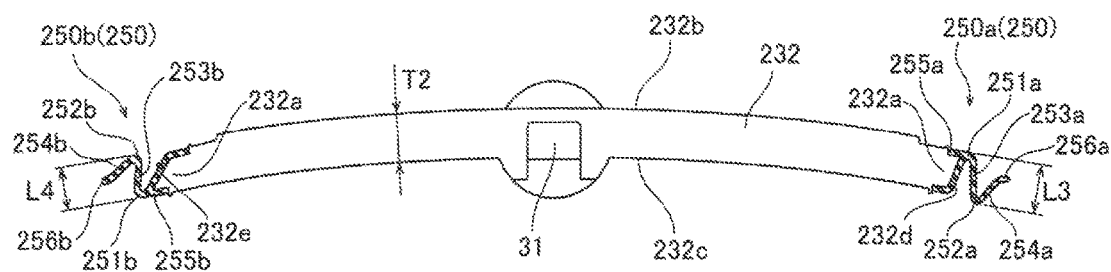
FIG. 11 is a cross-sectional view illustrating the valve body of the air intake apparatus according to the second embodiment of the invention.

As illustrated in FIG. 11, the seal portion 250 is mounted at an outer peripheral portion 232a of the valve body 232 in the second embodiment so as to seal between the inner wall surface 25 (refer to FIGS. 3 and 4) of the opening portion 24 of the second port portion 22 and the valve body 232. The seal portion 250, which is made of rubber, is configured to be elastically deformable. The seal portion 250 includes the first seal portion 250a mounted to one side (i.e., a side close to the cylinder of the engine 10) of the outer peripheral portion 232a of the valve body 232 in the direction orthogonal to the rotation shaft 31 and the second seal portion 250b mounted to the other side (i.e., a side away from the cylinder of the engine 10) of the outer peripheral portion 232a of the valve body 232 in the direction orthogonal to the rotation shaft 31. The first seal portion 250a and the second seal portion 250b are configured as separate bodies from each other.

Figure 12:
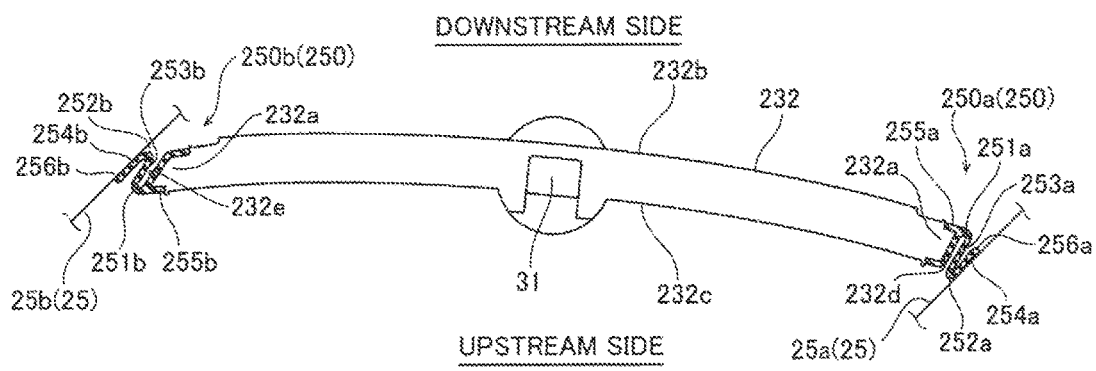
FIG. 12 is a cross-sectional view illustrating a state where the valve body of the air intake apparatus is positioned at the closed position according to the second embodiment of the present invention.

As illustrated in FIG. 12, the first seal portion 250a is configured to seal between the inner wall surface 25 of the second port portion 22 and the valve body 232 by making contact with the contact surface 25a of the inner wall surface 25 of the opening portion 24 in a state where the valve body 232 is at the closed position. The second seal portion 250b is configured to seal between the inner wall surface 25 of the second port portion 22 and the valve body 232 by making contact with the contact surface 25b of the inner wall surface 25 of the opening portion 24 in the state where the valve body 232 is at the closed position. The first seal portion 250a (the second seal portion 250b) is formed in a bending configuration including the first hinge portion 251a (251b) and a second hinge portion 252a (252b) serving as the supporting points upon elastic deformation of the first seal portion 250a (the second seal portion 250b). Specifically, the first hinge portion 251a and the second hinge portion 252a of the first seal portion 250a are disposed at the one surface 232b side (the outlet port 23 side) and the other surface 232c side (the surge tank 1 side) of the valve body 232 at the outer peripheral portion 232a of the valve body 232, respectively. The first hinge portion 251b and the second hinge portion 252b of the second seal portion 250b are arranged at the other surface 232c side (the surge tank 1 side) and the one surface 232b side (the outlet port 23 side) of the valve body 232 at the outer peripheral portion 232a of the valve body 232, respectively. That is, as illustrated in FIG. 12, the first hinge portion 251a and the second hinge portion 252a of the first seal portion 250a are arranged at the downstream side and the upstream side of the air intake port 2, respectively, in the state where the valve body 232 is at the closed position. The first hinge portion 251b and the second hinge portion 252b of the second seal portion 250b are arranged at the upstream side and the downstream side of the air intake port 2, respectively, in the state where the valve body 232 is at the closed position.

The first seal portion 250a (the second seal portion 250b) includes a connection portion 253a (253b) being elastically deformable to connect the first hinge portion 251a (251b) and the second hinge portion 252a (252b), and a contact portion 254a (254b) being elastically deformable to extend outwardly from the second hinge portion 252a (252b). In other words, the first seal portion 250a (the second seal portion 250b) is formed in a bending configuration in a letter-V shape by the connection portion 253a (253b) and the contact portion 254a (254b). In addition, the first seal portion 250a and the second seal portion 250b include letter-V configurations which are opposite from each other. Then, the first hinge portion 251a (251b) is provided at one end of the bending configuration in the letter-V shape facing the valve body 232 while the second hinge portion 252a (252b) is provided at a halfway return point of the bending configuration in the letter-V shape. The first seal portion 250a (the second seal portion 250b) is mounted to the outer peripheral portion 232a of the valve body 232 in a state where an attachment portion 255a (255b) connected via the first hinge portion 251a (251b) is bonded by vulcanization to a side end surface of the outer peripheral portion 232a, the one surface 232b and the other surface 232c of the valve body 232. Specifically, as illustrated in FIG. 10, the side end surface at one side of the outer peripheral portion 232a of the valve body 232 is formed by an inclination surface 232d inclined in the same direction so as to conform to the contact surface 25a formed by the inclination surface of the second port portion 22. The first seal portion 250a is mounted to the inclination surface 232d. In addition, the side end surface at the other side of the outer peripheral portion 232a of the valve body 232 is formed by an inclination surface 232e inclined in the same direction so as to conform to the contact surface 25b formed by the inclination surface of the second port portion 22. The second seal portion 250b is mounted to the inclination surface 232e. The first seal portion 250a (the second seal portion 250b) includes a length L3 (L4) in the thickness direction of the valve body 232 equal to or smaller than a thickness T2 of the valve body 232 in the plate form. Each of the inclination surfaces 232d and 232e is an example of a second inclination surface.

The connection portion 253a (253b) of the first seal portion 250a (the second seal portion 250b) is formed so that a tip end portion side protrudes towards the other surface 232c (the one surface 232b) of the valve body 232. The contact portion 254a (254b) is formed so that a tip end portion side protrudes towards the one surface 232b (the other surface 232c) of the valve body 232. As illustrated in FIG. 11, a folding portion 256a (256b) folded outwardly is integrally formed at a tip end portion of the contact portion 254a (254b). Then, as illustrated in FIG. 12, when the valve body 232 rotates to the closed position, the folding portion 256a (256b) makes contact with the contact surface 25a (25b) to be elastically deformed inwardly. Thus, by its returning force, the folding portion 256a (256b) makes close contact with the contact surface 25a (25b). Accordingly, in the state where the valve body 232 is at the closed position, the sealing ability between the valve body 232 and the contact surface 25a (25b) is enhanced.

The first seal portion 250a (the second seal portion 250b) is configured so that the contact portion 254a (254b) makes contact with the contact surface 25a (25b) of the inner wall surface 25 of the opening portion 24 in a case where the valve body 232 rotates to the closed position. In a case where the pressure difference exists between the one surface 232b side (the downstream side of the air intake port 2) and the other surface 232c side (the upstream side of the air intake port 2) of the valve body 232 in the state where the valve body 232 is at the closed position, the first seal portion 250a (the second seal portion 250b) is configured so that the contact portion 254a (254b) makes contact with the contact surface 25a (25b) of the inner wall surface 25 of the opening portion 24 in a further closely contacting state by an application of a force in a direction where the connection portion 253a (253b) or the contact portion 254a (254b) is elastically deformed with reference to the first hinge portion 251a (251b) or the second hinge portion 252a (252b) serving as the supporting point by the aforementioned pressure difference.

Specifically, in a case where the pressure at the one surface 232b side (the downstream side of the air intake port 2) of the valve body 32 is lower than the pressure at the other surface 232c side (the upstream side of the air intake port 2), as illustrated in FIG. 13, the first seal portion 250a is configured so that the contact portion 254a makes contact with the contact surface 25a of the inner wall surface 25 of the opening portion 24 in a further closely contacting state by an application of a force causing the connection portion 253a to be elastically deformed in a direction where the connection portion 253a expands outwardly with reference to the first hinge portion 251a serving as the supporting point by the aforementioned pressure difference. In a case where the pressure at the one surface 232b side (the downstream side of the air intake port 2) of the valve body 232 is lower than the pressure at the other surface 232c side (the upstream side of the air intake port 2), as illustrated in FIG. 14, the second seal portion 250b is configured so that the contact portion 254b makes contact with the contact surface 25b of the inner wall surface 25 of the opening portion 24 in a further closely contacting state by an application of a force causing the contact portion 254b to be elastically deformed outwardly with reference to the second hinge portion 252b serving as the supporting point by the aforementioned pressure difference.

In a case where the pressure at the other surface 232c side (the upstream side of the air intake port 2) of the valve body 232 becomes lower than the pressure at the one surface 232b side (the downstream side of the air intake port 2) by the air intake pulsation, as illustrated in FIG. 15, the first seal portion 250a is configured so that the contact portion 254a makes contact with the contact surface 25a of the inner wall surface 25 of the opening portion 24 in a further closely contacting state by an application of a force causing the contact portion 254a to be elastically deformed outwardly with reference to the second hinge portion 252a serving as the supporting point by the aforementioned pressure difference. In a case where the pressure at the other surface 232c side (the upstream side of the air intake port 2) of the valve body 232 becomes lower than the pressure at the one surface 232b side (the downstream side of the air intake port 2) by the air intake pulsation, as illustrated in FIG. 16, the second seal portion 250b is configured so that the contact portion 254b makes contact with the contact surface 25b of the inner wall surface 25 of the opening portion 24 in a further closely contacting state by an application of a force causing the connection portion 253b to be elastically deformed in a direction where the connection portion 253b expands outwardly with reference to the first hinge portion 251b serving as the supporting point by the aforementioned pressure difference.

Next, deformation states of the first seal portion 250a and the second seal portion 250b in a case where the pressure at the one surface 232b side (the downstream side of the air intake port 2) of the valve body 232 is lower than the pressure at the other surface 232c side (the upstream side of the air intake port 2) in the state where the valve body 232 is at the closed position are explained with reference to FIGS. 12 to 14. In the second embodiment, as compared to the aforementioned first embodiment, the reversed deformation states between the first seal portion 250a side and the second seal portion 250b side are obtained. In the following, a detailed explanation is made.

In a case where the valve body 232 rotates to the closed position, as illustrated in FIG. 12, the contact portion 254a (254b) of the first seal portion 250a (the second seal portion 250b) makes contact with the contact surface 25a (25b) of the inner wall surface 25 of the opening portion 24 to seal between the valve body 232 and the inner wall surface 25 of the second port portion 22. In the aforementioned state, in a case where the pressure at the one surface 232b side (the downstream side of the air intake port 2) of the valve body 232 is lower than the pressure at the other surface 232c side (the upstream side of the air intake port 2), as illustrated in FIG. 13, the connection portion 253a of the first seal portion 250a receives the force (refer to arrows in FIG. 13) causing the connection portion 253a to be elastically deformed outwardly with reference to the first hinge portion 251a serving as the supporting point by the aforementioned pressure difference so that the connection portion 253a is pressed against the contact portion 254a. Then, the contact portion 254a of the first seal portion 250a receives the force (refer to the arrows in FIG. 13) causing the contact portion 254a to be elastically deformed outwardly via the connection portion 253a so that the contact portion 254a makes contact with the contact surface 25a in a further closely contacting state. Accordingly, in a case where the pressure at the one surface 232b side (the downstream side of the air intake port 2) of the valve body 232 is lower than the pressure at the other surface 232c side (the upstream side of the air intake port 2), a portion between the valve body 232 and the inner wall surface 25 is excellently sealed at one side of the outer peripheral portion 232a of the valve body 232 in the direction orthogonal to the rotation shaft 31.

On the other hand, as illustrated in FIG. 14, the connection portion 253b of the second seal portion 250b receives the force (refer to arrows in FIG. 14) causing the connection portion 253b to be elastically deformed inwardly with reference to the first hinge portion 251b serving as the supporting point by the aforementioned pressure difference so that the connection portion 253b makes contact with the attachment portion 255b. Accordingly, the movement of the second hinge portion 252b to the inner side is restricted. Then, in a state where the movement of the second hinge portion 252b to the inner side is restricted, the contact portion 254b of the second seal portion 250b receives the force (refer to the arrows in FIG. 14) causing the contact portion 254b to be elastically deformed outwardly with reference to the second hinge portion 252b as the supporting point by the pressure difference so that the contact portion 254b makes contact with the contact surface 25b in a further closely contacting state. Accordingly, in a case where the pressure at the one surface 232b side (the downstream side of the air intake port 2) of the valve body 232 is lower than the pressure at the other surface 232c side (the upstream side of the air intake port 2), a portion between the valve body 232 and the inner wall surface 25 is also excellently sealed at the other side of the outer peripheral portion 232a of the valve body 232 in the direction orthogonal to the rotation shaft 31.

Next, the deformation states of the first seal portion 250a and the second seal portion 250b in a case where the pressure at the other surface 232c side (the upstream side of the air intake port 2) of the valve body 232 becomes lower than the pressure at the one surface 232b side (the downstream side of the air intake port 2) by the air intake pulsation in the state where the valve body 232 is at the closed position is explained. In this case, as compared to the case where the pressure at the one surface 232b side of the valve body 232 is lower than the pressure at the other surface 232c side, the reversed deformation states between the first seal portion 250a side and the second seal portion 250b side are obtained. In the following, a detailed explanation is made.

In a case where the valve body 232 rotates to the closed position, as illustrated in FIG. 12, the contact portion 254a (254b) of the first seal portion 250a (the second seal portion 250b) makes contact with the contact surface 25a (25b) of the inner wall surface 25 of the opening portion 24 to seal between the valve body 232 and the inner wall surface 25 of the second port portion 22. In the aforementioned state, in a case where the pressure at the other surface 232c side (the upstream side of the air intake port 2) of the valve body 232 becomes lower than the pressure at the one surface 232b side (the downstream side of the air intake port 2) by the air intake pulsation, as illustrated in FIG. 15, the connection portion 253a of the first seal portion 250a receives the force (refer to arrows in FIG. 15) causing the connection portion 253a to be elastically deformed inwardly with reference to the first hinge portion 251a serving as the supporting point by the aforementioned pressure difference so that the connection portion 253a makes contact with the attachment portion 255a. Accordingly, the movement of the second hinge portion 252a to the inner side is restricted. In a state where the movement of the second hinge portion 252a to the inner side is restricted, the contact portion 254a of the first seal portion 250a receives the force (refer to arrows in FIG. 15) causing the contact portion 254a to be elastically deformed outwardly with reference to the second hinge portion 252a serving as the supporting point by the pressure difference so that the contact portion 254a makes contact with the contact surface 25a in a further closely contacting state. Accordingly, in a case where the pressure at the other surface 232c side (the upstream side of the air intake port 2) of the valve body 232 becomes lower than the pressure at the one surface 232b side (the downstream side of the air intake port 2) by the air intake pulsation, the portion between the valve body 232 and the inner wall surface 25 of the second port portion 22 is excellently sealed at one side of the outer peripheral portion 232a of the valve body 232 in the direction orthogonal to the rotation shaft 31.

On the other hand, as illustrated in FIG. 16, the connection portion 253b of the second seal portion 250b receives the force (refer to arrows in FIG. 16) causing the connection portion 253b to be elastically deformed outwardly with reference to the first hinge portion 251b by the aforementioned pressure difference so that the connection portion 253b is pressed against the contact portion 254b. Then, the contact portion 254b of the second seal portion 250b receives the force (refer to the arrows in FIG. 16) causing the contact portion 254b to be elastically deformed outwardly via the connection portion 253b so that the contact portion 254b makes contact with the contact surface 25b in a further closely contacting state. Accordingly, in a state where the pressure at the other surface 232c side (the upstream side of the air intake port 2) of the valve body 232 becomes lower than the pressure at the one surface 232b side (the downstream side of the air intake port 2) by the air intake pulsation, the portion between the valve body 232 and the inner wall surface 25 of the second port portion 22 is also excellently sealed at the other side of the outer peripheral portion 232a of the valve body 232 in the direction orthogonal to the rotation shaft 31.

The other configurations of the second embodiment are the same as the aforementioned first embodiment.

In the second embodiment, as mentioned above, the contact surface 25a (25b) formed by the inclination surface is formed at the inner wall surface 25 of the air intake port 2 and the inclination surface 232d (232e) conforming to the contact surface 25a (25b) of the opening portion 24 of the air intake port 2 is formed at the outer peripheral portion 232a of the valve body 232. Then, the seal portion 250 including the first hinge portion 251a (251b) and the second hinge portion 252a (252b) is mounted to the outer peripheral portion 232a of the valve body 232 including the inclination surface 232d (232e). Accordingly, the smooth circulation of intake air is obtainable by the contact surface 25a (25b) formed by the inclination surface of the air intake port 2, which may restrain the pressure loss of intake air flowing through the air intake port 2. In addition, the inclination surface 232d (232e) conforming to the contact surface 25a (25b) formed by the inclination surface of the air intake port 2 is formed at the outer peripheral portion 232a of the valve body 232 so that the seal portion 250 mounted to the outer peripheral portion 232a of the valve body 232 easily makes contact with the inner wall surface 25 of the air intake port 2.

In addition, in the second embodiment, in the same way as the first embodiment, the seal portion 250 is formed in the bending configuration including the first hinge portion 251a (251b) and the second hinge portion 252a (252b) serving as the supporting points upon the elastic deformation. One of the first hinge portion 251a (251b) and the second hinge portion 252a (252b) is arranged at the upstream side and the other is arranged at the downstream side of the air intake port 2 in the state where the valve body 232 is at the closed position. Accordingly, in a case where the pressure difference exists between the one surface 232b side (the downstream side of the air intake port 2) and the other surface 232c side (the upstream side of the air intake port 2) of the valve body 232 in the state where the valve body 232 is at the closed position, the seal portion 250 is elastically deformable in the direction further expanding outwardly with reference to either the first hinge portion 251a (251b) or the second hinge portion 252a (252b) as the supporting point. As a result, the tip end portion (the contact portion 254a (254b)) of the seal portion 250 may make further close contact with the inner wall surface 25 of the air intake port 2, which may maintain the excellent sealing ability.

In addition, even in a case where the magnitude correlation between the pressure at the one surface 232b side (the downstream side of the air intake port 2) of the valve body 232 and the pressure at the other surface 232c side (the upstream side of the air intake port 2) is reversed resulting from the air intake pulsation, the seal portion 250 is elastically deformable in the direction where the seal portion 250 further expands outwardly with reference to either the first hinge portion 251a (251b) or the second hinge portion 252a (252b) serving as the supporting point, which may excellently maintain the sealing ability.

The other effects of the second embodiment are the same as the first embodiment.

It should be regarded that the embodiments disclosed here are examples at all points and are not restrictive. The scope of the invention is represented not by the aforementioned explanations of the embodiments but by the scope of claims. Further, the scope of the invention includes the meaning equivalent to the scope of claims and any changes within the scope of claims.

For example, in the first and second embodiments, the example in which the air intake control valve and the air intake apparatus of the present invention are employed to the in-line four cylinder engine for automobiles is described, however, the present invention is not limited thereto. The air intake control valve and the air intake apparatus of the present invention may be employed to an internal combustion engine other than an automobile engine or employed to an internal combustion engine other than an in-line four cylinder engine.

In addition, in the first and second embodiments, the example in which the air intake control valve of the present invention is employed to the air intake control valve for variable air intake changing the air intake path length is described, however, the present invention is not limited thereto. The air intake control valve of the present invention may be employed to a tumble control valve (TCV) generating longitudinal vortex or a swirl control valve (SCV) generating transverse vortex, other than the air intake control valve for variable air intake.

Further, in the first and second embodiments, the example in which the first seal portion and the second seal portion are configured as separate bodies from each other is described, however, the present invention is not limited thereto. In the present embodiment, the first seal portion and the second seal portion may be configured integrally.

Furthermore, in the first and second embodiments, the example where the positions at which the first hinge portion and the second hinge portion are arranged are opposite from each other between the first seal portion and the second seal portion is described, however, the present invention is not limited thereto. In the present invention, the positions at which the first hinge portion and the second hinge portion are arranged may be provided at the same side between the first seal portion and the second seal portion. That is, the first hinge portion may be arranged at the downstream side (upstream side) while the second hinge portion may be arranged at the upstream side (downstream side) at both of the first seal portion and the second seal portion.

EXPLANATION OF REFERENCE NUMERALS 1 surge tank
2 air intake port
3 air intake control valve
25 inner wall surface
25a, 25b contact surface (first inclination surface)
31 rotation shaft
32, 232 valve body
32a, 232a outer peripheral portion
32b, 232b one surface
32c, 232c other surface
50, 250 seal portion
50a, 250a first seal portion
50b, 250b second seal portion
51a, 51b, 251a, 251b first hinge portion
52a, 52b, 252a, 252b second hinge portion
53a, 53b, 253a, 253b connection portion
54a, 54b, 254a, 254b contact portion
100, 200 air intake apparatus
232d, 232e inclination surface (second inclination surface)

The invention claimed is:

1. An air intake control valve comprising:
a valve body provided at an air intake port to rotate around a rotation shaft between an open position and a closed position; and
a seal portion arranged at a first side and a second side of an outer peripheral portion of the valve body in a direction orthogonal to the rotation shaft of the valve body and sealing between an inner wall surface of the air intake port and the valve body by making contact with the inner wall surface of the air intake port in a state where the valve body is at the closed position, the seal portion being elastically deformable,
the seal portion being formed in a bending configuration including a first hinge portion and a second hinge portion each serving as a supporting point upon elastic deformation of the seal portion, one of the first hinge portion and the second hinge portion being arranged at an upstream side of the air intake port and the other of the first hinge portion and the second hinge portion is arranged at a downstream side of the air intake port in the state where the valve body is at the closed position, wherein the seal portion includes an attachment portion mounted to the valve body and connected to the first hinge portion, a connection portion connecting the first hinge portion and the second hinge portion, and a contact portion protruding outwardly from the second hinge portion, the connection portion of the seal portion arranged at the first side is configured to make contact with the attachment portion by a pressure difference between an upstream side and a downstream side in the state where the valve body is at the closed position, the connection portion of the seal portion arranged at the second side is configured to make contact with the contact portion by the pressure difference between the upstream side and the downstream side in the state where the valve body is at the closed position, and the contact portion is configured to make contact with the inner wall surface of the air intake port in a further closely contacting state by an application of a force in a direction in which the connection portion and the contact portion are elastically deformed with reference to the first hinge portion or the second hinge portion serving as the supporting point by the pressure difference between the upstream side and the downstream side in the state where the valve body is at the closed position.

2. The air intake control valve according to claim 1, wherein the seal portion is formed in a bending configuration in a letter-V shape by the connection portion and the contact portion, and the first hinge portion and the second hinge portion are provided at one end and a halfway return point of the bending configuration in the letter-V shape respectively.

3. The air intake control valve according to claim 1, wherein
the valve body is formed in a plate form,
the seal portion including the first hinge portion and the second hinge portion includes a length in a thickness direction of the valve body equal to or smaller than a thickness of the valve body in the plate form.

4. The air intake control valve according to claim 1, wherein the seal portion includes:
a first seal portion arranged at a portion at the first side of the outer peripheral portion of the valve body in the direction orthogonal to the rotation shaft of the valve body, the first hinge portion being arranged at an upstream side while the second hinge portion being arranged at a downstream side; and
a second seal portion arranged at a portion at the second side of the outer peripheral portion of the valve body in the direction orthogonal to the rotation shaft of the valve body, the first hinge portion being arranged at a downstream side while the second hinge portion being arranged at an upstream side.

5. The air intake control valve according to claim 4, wherein
each of the first seal portion and the second seal portion includes a connection portion connecting the first hinge portion and the second hinge portion and a contact portion protruding outwardly from the second hinge portion, the first seal portion is configured so that the contact portion makes contact with the inner wall surface of the air intake port in a further closely contacting state by an application of a force causing the contact portion to be elastically deformed outwardly with reference to the second hinge portion serving as the supporting point by a pressure difference in a case where a pressure at a downstream side is lower than a pressure at an upstream side in the state where the valve body is at the closed position, the second seal portion is configured so that the contact portion makes contact with the inner wall surface of the air intake port in a further closely contacting state by an application of a force causing the connection portion to be elastically deformed in a direction where the connection portion expands outwardly with reference to the first hinge portion serving as the supporting point by a pressure difference in a case where a pressure at a downstream side is lower than a pressure at an upstream side in the state where the valve body is at the closed position.

6. The air intake control valve according to claim 5, wherein
the first seal portion is configured so that the contact portion makes contact with the inner wall surface of the air intake port in a further closely contacting state by an application of a force causing the connection portion to be elastically deformed in a direction where the connection portion expands outwardly with reference to the first hinge portion serving as the supporting point by a pressure difference in a case where a pressure at an upstream side becomes lower than a pressure at a downstream side by an air intake pulsation in the state where the valve body is at the closed position, the second seal portion is configured so that the contact portion makes contact with the inner wall surface of the air intake port in a further closely contacting state by an application of a force causing the contact portion to be elastically deformed outwardly with reference to the second hinge portion serving as the supporting point by a pressure difference in a case where a pressure at an upstream side becomes lower than a pressure at a downstream side by an air intake pulsation in the state where the valve body is at the closed position.

7. An air intake apparatus comprising:
a surge tank and an air intake port arranged at a downstream of the surge tank; and
an air intake control valve provided at the air intake port, wherein
the air intake control valve includes:
a valve body rotating around a rotation shaft between an open position and a closed position;
a seal portion arranged at a first side and a second side of an outer peripheral portion of the valve body in a direction orthogonal to the rotation shaft of the valve body and sealing between an inner wall surface of the air intake port and the valve body by making contact with the inner wall surface of the air intake port in a state where the valve body is at the closed position, the seal portion being elastically deformable, the seal portion being formed in a bending configuration including a first hinge portion and a second hinge portion each serving as a supporting point upon elastic deformation of the seal portion, one of the first hinge portion and the second hinge portion being arranged at an upstream side of the air intake port and the other of the first hinge portion and the second hinge portion being arranged at a downstream side of the air intake port in the state where the valve body is at the closed position, wherein the seal portion includes an attachment portion mounted to the valve body and connected to the first hinge portion, a connection portion connecting the first hinge portion and the second hinge portion, and a contact portion protruding outwardly from the second hinge portion, the connection portion of the seal portion arranged at the first side is configured to make contact with the attachment portion by a pressure difference between an upstream side and a downstream side in the state where the valve body is at the closed position, the connection portion of the seal portion arranged at the second side is configured to make contact with the contact portion by the pressure difference between the upstream side and the downstream side in the state where the valve body is at the closed position, and the contact portion is configured to make contact with the inner wall surface of the air intake port in a further closely contacting state by an application of a force in a direction in which the connection portion and the contact portion are elastically deformed with reference to the first hinge portion or the second hinge portion serving as the supporting point by the pressure difference between the upstream side and the downstream side in the state where the valve body is at the closed position.

8. The air intake apparatus according to claim 7, wherein the inner wall surface of the air intake port includes a contact surface formed by a first inclination surface, the outer peripheral portion of the valve body includes a second inclination surface conforming to the first inclination surface of the contact surface of the air intake port, the seal portion including the first hinge portion and the second hinge portion is mounted to the outer peripheral portion of the valve body including the second inclination surface.

* * * * *